United States Patent
Tadayon et al.

(10) Patent No.: US 10,908,299 B1
(45) Date of Patent: Feb. 2, 2021

(54) USER EQUIPMENT POSITIONING APPARATUS AND METHODS

(71) Applicants: Navid Tadayon, Kanata (CA); Hamidreza Farmanbar, Ottawa (CA); Yicheng Lin, Ottawa (CA)

(72) Inventors: Navid Tadayon, Kanata (CA); Hamidreza Farmanbar, Ottawa (CA); Yicheng Lin, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/556,824

(22) Filed: Aug. 30, 2019

(51) Int. Cl.
  *H04W 64/00* (2009.01)
  *H04W 84/00* (2009.01)
  *G01S 19/47* (2010.01)
  *G01S 19/41* (2010.01)
  *H04W 4/02* (2018.01)

(52) U.S. Cl.
  CPC .............. *G01S 19/47* (2013.01); *G01S 19/41* (2013.01); *H04W 4/027* (2013.01); *H04W 64/00* (2013.01); *H04W 84/005* (2013.01)

(58) Field of Classification Search
  CPC ...... G01C 21/165; G01C 21/16; G01C 21/20; G01C 21/12; H04W 64/00; H04W 4/029; H04W 4/02; H04W 4/023; H04W 52/0251; H04W 88/08; H04W 4/025; H04W 4/027; H04W 64/006
  See application file for complete search history.

(56) References Cited

U.S. PATENT DOCUMENTS

2019/0166453 A1 * 5/2019 Edge ......................... G01S 5/06
2019/0364390 A1 * 11/2019 Kurras .................. H04W 64/00

OTHER PUBLICATIONS

J. Schroeder, S. Galler, K. Kyamakya, and K. Jobmann, "NLOS detection algorithms for Ultra-Wideband localization," in Workshop on Positioning, Navigation and Commun. (WPNC), Mar. 2007, pp. 159-166.
S. Gezici, H. Kobayashi, and H. V. Poor, "Non-Parametric Non-Line-Of-Sight Identification," in Proc. IEEE Semiannual Veh. Technol. Conf., vol. 4, Orlando, FL, Oct. 2003, pp. 2544-2548.
F. Benedetto, G. Giunta, A. Toscano, and L. Vegni, "Dynamic LOS/NLOS Statistical Discrimination of Wireless Mobile Channels," in Proc. IEEE Semiannual Veh. Technol. Conf., Los Angeles, CA, Apr. 2007, pp. 3071-3075.
H. Wymeersch, S. Marano, W. Gifford and M. Win, "Machine Learning Approach to Ranging Error Mitigation for UWB Localization," IEEE Transactions on Communications, vol. 60, No. 6, 2012, pp. 1719-1728.
S. Marano, W. M. Gifford, H. Wymeersch and M. Win, "NLOS Identification and Mitigation for Localization Based on UWB Experimental Data," IEEE Journal on Selected Areas in Communications, vol. 28, No. 7, 2010, pp. 1026-1035.

* cited by examiner

*Primary Examiner* — Kwasi Karikari

(57) ABSTRACT

Corrected User Equipment (UE) positioning is based at least in part on signaling that is associated with UE inertial measurements. Such measurements are used in some embodiments to track UE locations along trajectories of UE movement and develop or obtain a model to subsequently predict UE positioning corrections based on channel estimates of a wireless channel. For example, reference signaling may be transmitted by a UE, and the UE then receives positioning corrections or corrected positioning in response to the reference signaling.

21 Claims, 10 Drawing Sheets

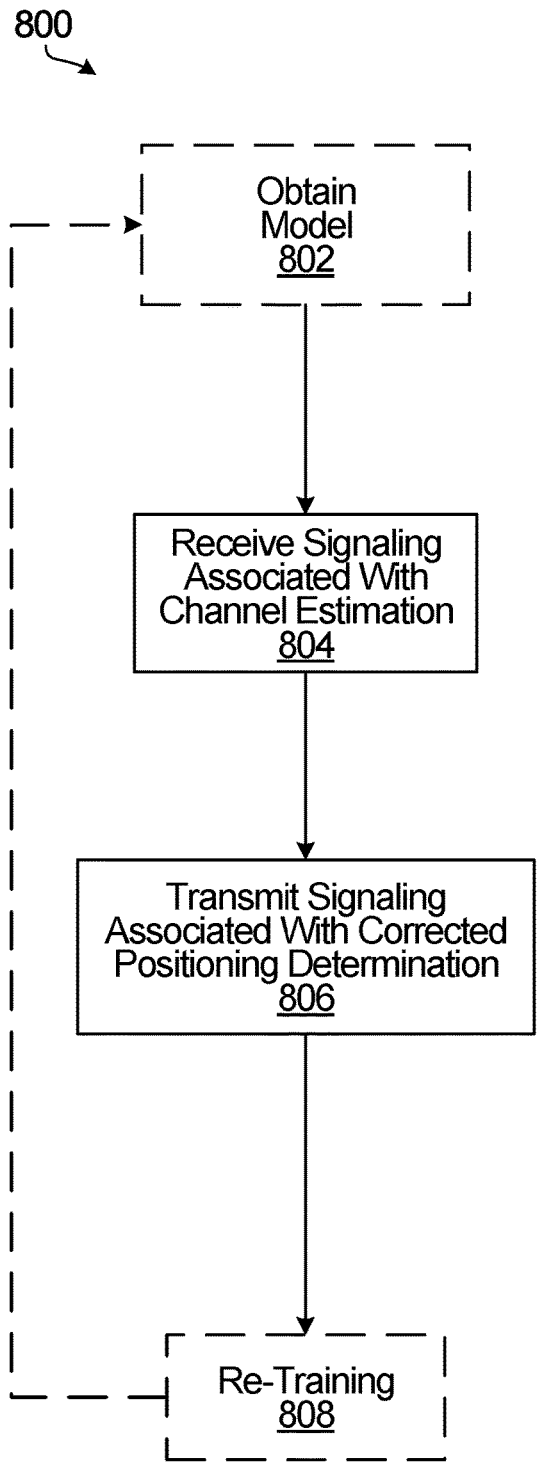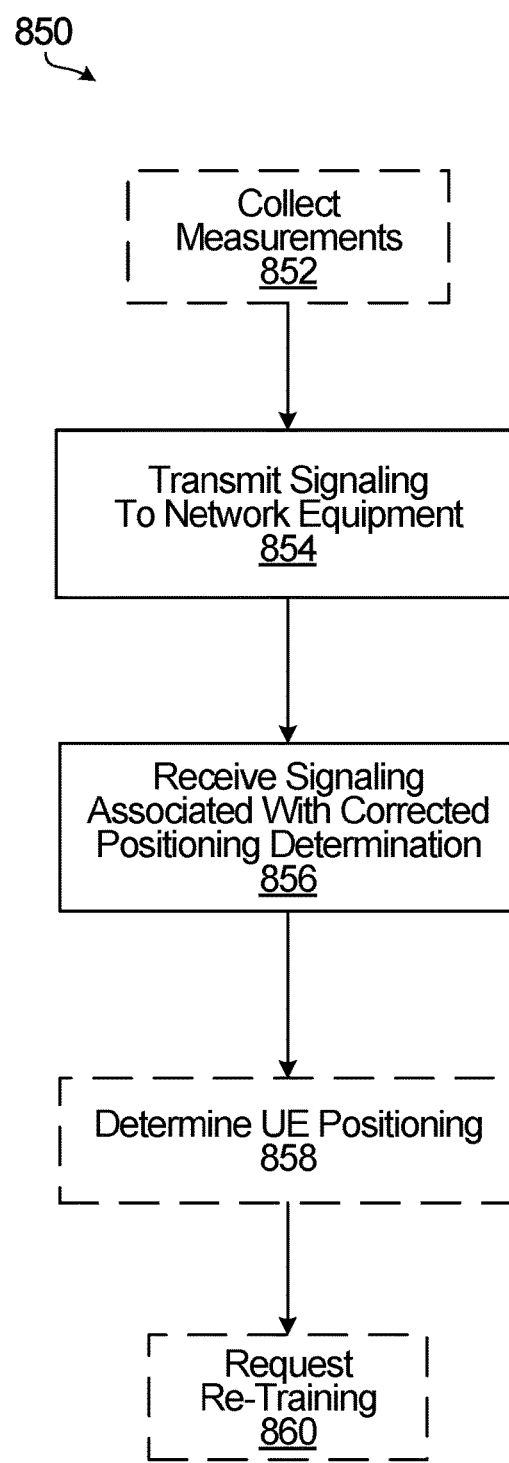
FIG. 8A
FIG. 8B

USER EQUIPMENT POSITIONING APPARATUS AND METHODS

FIELD

This application relates to wireless communications, and in particular to User Equipment (UE) positioning determination in wireless communication networks.

BACKGROUND

Lack of Line of Sight (LoS) communications, also referred to as Non Line of Sight (NLoS), impacts the accuracy of estimating the position or location of a UE in a wireless communication network. This phenomenon occurs because NLoS creates bias in the estimation of direct-path parameters such as Time of Flight (ToF), also referred to as range, and Angle of Arrival (AoA), which are two sources of information that are crucial for geometric-based positioning. In particular, prior information of NLoS range biases $l_j(t)$ to all Base Stations (BSs) is needed to be able to form a well-conditioned range-based positioning problem that has a unique and unbiased solution. By definition, $l_j(t)$ represents the extra time it takes for a wave to travel between a $j^{th}$ BS and a UE over the "strongest" indirect path relative to a direct path. The NLoS bias term $l_j(t)$ is a function of locations and electrical properties of any diffusers and reflectors that are distributed in an overlapping field of views of transmitter and receiver antennas.

It should be noted that NLoS is not equivalent to multipath. A signal might undergo multipath, yet the power of a ray propagating along a direct path is stronger than indirect rays reaching a receiver through reflections. In an NLoS scenario that is problematic for UE positioning determination, a direct LoS ray between a BS and a UE is weaker than one or more indirect rays, and therefore a receiver has no way of distinguishing the LoS ray from the NLoS ray(s).

Positioning with range estimations that are biased results in location estimates can be off by tens of meters. This makes NLoS one of the most significant source of positioning error in wireless communication networks, which typically operate in cluttered environments with NLoS caused by physical blockages of direct paths between transmitters and receivers. Although the NLoS positioning problem can be more contained in certain types of networks, such as $5^{th}$ Generation New Radio (5G NR) networks with a positioning subsystem and involvement of more BSs in the positioning process for a single UE, NLoS communications can still create challenges in terms of UE positioning determination.

Efforts in addressing the issue of NLoS include LoS identification and LoS mitigation. LoS identification algorithms attempt to identify whether a link is a LoS link or an NLoS link. Links that are identified as NLoS are eliminated from positioning determination, which uses only the identified LoS links. LoS mitigation approaches attempt to determine how much NLoS error was added to each link and subtract that error from raw estimations of range, so that all links become usable. Challenges with these approaches include effectively distinguishing between LoS and NLoS links for LoS identification, and accurately determining NLoS error for each link in LoS mitigation.

A simpler UE positioning determination approach that leverages existing infrastructure and supports UE positioning determination with NLoS error correction is desirable.

SUMMARY

Aspects of the present disclosure relate to NLoS error mitigation, also referred to as LoS mitigation, through UE position tracking that is anchored at LoS locations in some embodiments. Although disclosed embodiments include learning-based implementations, other embodiments are also possible.

According to one aspect of this disclosure, a method performed by network equipment in a wireless communication network involves receiving signaling that is associated with channel estimation of a wireless channel for a UE, and transmitting signaling associated with corrected positioning determination for the UE, the corrected positioning determination being based on the received signaling and previous signaling by the UE or another UE, the previous signaling associated with inertial measurements by the UE or the other UE.

Network equipment for a wireless communication network, according to another aspect, includes a receiver, a transmitter, a processor coupled to the receiver and to the transmitter, and a processor-readable memory, coupled to the processor, and storing processor-executable instructions which, when executed by the processor, cause the processor to perform a method. The method involves receiving signaling that is associated with channel estimation of a wireless channel for a UE, and transmitting signaling associated with corrected positioning determination for the UE. As noted above, the corrected positioning determination is based on the received signaling and previous signaling by the UE or another UE, and the previous signaling is associated with inertial measurements by the UE or the other UE.

Another aspect relates to a processor-readable memory storing processor-executable instructions which, when executed by a processor in network equipment in a wireless communication network, cause the processor to perform such a method.

A method performed by a UE in a wireless communication network, according to a further aspect, involves: transmitting, to network equipment, reference signaling for channel estimation of a wireless channel and signaling associated with inertial measurements by the UE; and receiving, from the network equipment, signaling associated with corrected positioning determination for the UE, the corrected positioning determination being based on the transmitted reference signaling.

A UE in accordance with yet another aspect of the present disclosure includes a transmitter, a receiver, a processor coupled to the transmitter and to the receiver, and a processor-readable memory, coupled to the processor, and storing processor-executable instructions which, when executed by the processor, cause the processor to perform a method. The method, as described above, involves: transmitting, to network equipment, reference signaling for channel estimation of a wireless channel and signaling associated with inertial measurements by the UE; and receiving, from the network equipment, signaling associated with corrected positioning determination for the UE, the corrected positioning determination being based on the transmitted reference signaling.

Another aspect relates to a processor-readable memory storing processor-executable instructions which, when executed by a processor in a UE in a wireless communication network, cause the processor to perform such a method.

BRIEF DESCRIPTION OF THE DRAWINGS

Embodiments of the disclosure will now be described with reference to the attached drawings in which:

FIG. 8A is a flow chart illustrating an example of a method performed by network equipment in an embodiment;

FIG. 8B is a flow chart illustrating an example of a method performed by a UE in an embodiment;

DETAILED DESCRIPTION

Figure 1:
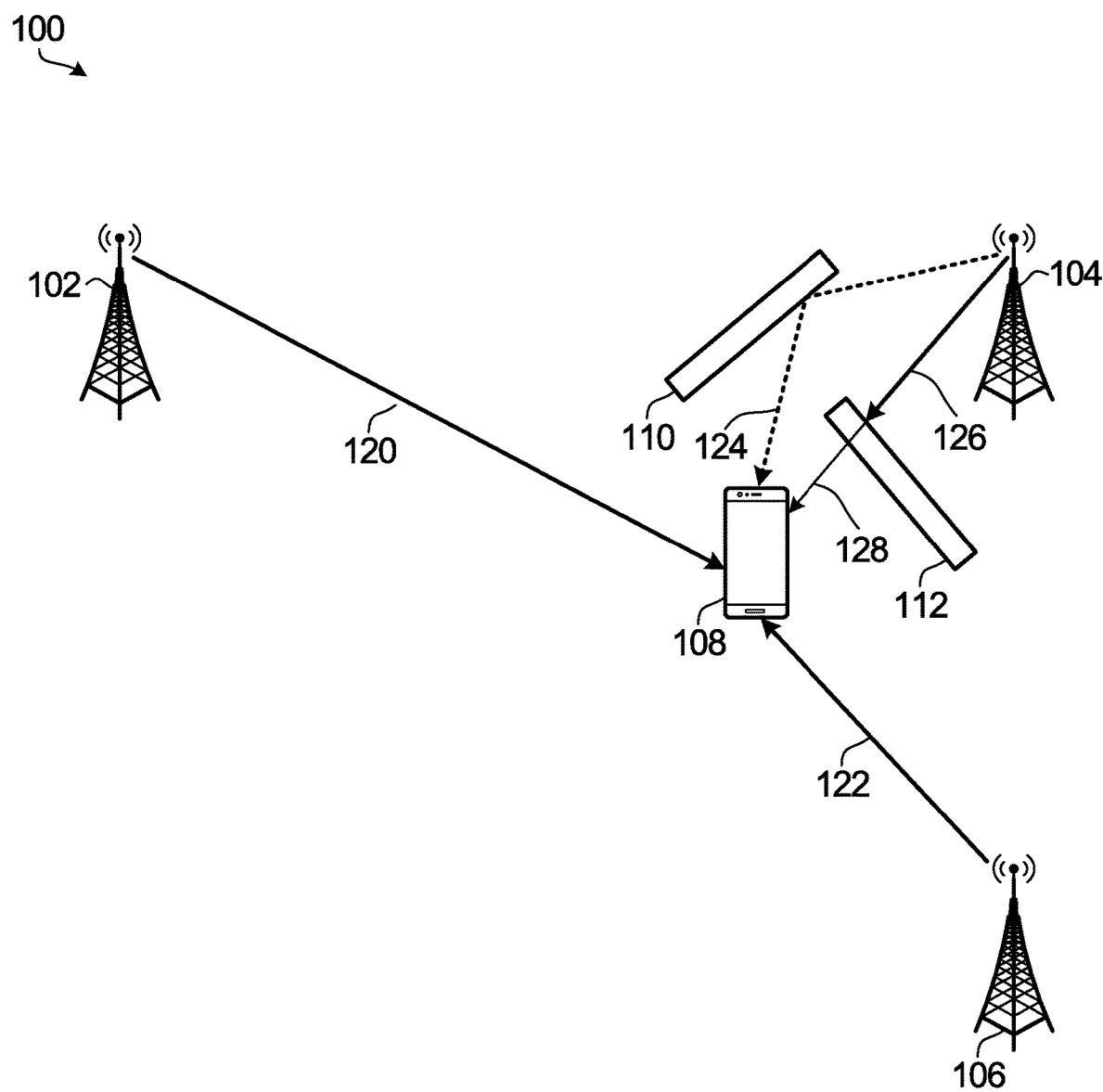
FIG. 1 is a block diagram illustrating a wireless communication network and an NLoS scenario.

FIG. 1 is a block diagram illustrating a wireless communication network and an NLoS scenario that can be problematic for UE positioning determination. In the example shown, the wireless communication network 100 includes BSs 102, 104, 106 and a UE 108, and the operating environment of the UE includes two obstacles 110, 112. LoS paths are shown at 120, 122, and an NLoS path is shown at 124. A further LoS path 126 between the UE 108 and the BS 104 is blocked by the obstacle 112, and therefore a "weak" LoS path is shown by a dashed line at 128. In this scenario, a ray propagating along NLoS path 124 may be stronger than the ray propagating along the weak LoS path 128 and therefore it is not possible to distinguish these LoS and NLoS rays from each other at the UE 108 based only on received signal power.

Although geometric-based approaches to UE positioning determination may be simple and cost-effective, such approaches tend to work well in a LoS scenario and when certain assumptions on signal, noise, channel, and array models are satisfied. However, NLoS scenarios are more common and realistic in wireless communication networks.

As noted above, efforts on addressing the issue of NLoS include LoS identification and LoS mitigation. The number of BSs that can communicate with UEs is limited, and therefore LoS identification might leave too few BSs to localize UE position. For example, in order to localize a UE in three dimensional (3D) space using triangulation, at least four BSs are needed. This can be a problem especially in cellular systems for urban areas where the probability of NLoS is normally higher than the probability for LoS. Although NLoS error subtraction according to LoS mitigation may make all links usable for positioning determination, LoS mitigation is a much harder problem to tackle than LoS identification.

Machine Learning (ML) has recently been considered for application to the problem of LoS mitigation. See, for example: H. Wymeersch, S. Marano, W. Gifford and M. Win, "Machine Learning Approach to Ranging Error Mitigation for UWB Localization," IEEE Transactions on Communications, vol. 60, no. 6, 2012, pp. 1719-1728; and S. Marano, W. M. Gifford, H. Wymeersch and M. Win, "NLOS Identification and Mitigation for Localization Based on UWB Experimental Data," IEEE Journal on Selected Areas in Communications, vol. 28, no. 7, 2010, pp. 1026-1035. The models considered in these papers assume the availability of training data, also referred to as labelled data. Each training sample point is comprised of the channel data observed at a given location, along with the "ground-truth" NLoS bias at that location. Although ground-truth NLoS bias is readily available for simulation data, in actual practice this would be impossible to obtain.

In order to obtain labelled data for ML training, expert systems in an ultra-wideband (UWB) radio system or a high-resolution imaging system are to be used. However, one issue with such approaches for labelled data collection, which is also referred to as fingerprinting, is that these types of systems are expensive to operate. Generated labelled data are also not completely error-free. In addition, there is a potential scalability issue, especially in the context of using an expert system in wireless networks where the environment undergoes frequent changes that necessitate intermittent collection of training data from the new environment in order to pursue retraining. Just one labelled data set for an area of 100 m by 100 m with 1 m by 1 m resolution, for example, requires collection of 10,000 distinct fingerprints. Clearly this presents a scalability challenge for higher resolutions, larger areas, and/or retraining in expert system-based implementations.

When environment changes are ignored and an ML or Artificial Intelligence (AI) model is trained on a stale data set and utilized to predict NLoS bias at a location whose channel conditions have changed, significant prediction error can be introduced. This error can manifest itself in the form of false alarms or misdetection, for example.

One possible approach to remedy the scalability issue of expert-system fingerprinting or at least mitigate the effects of that issue, in accordance with some embodiments, involves collecting labelled training data through UE "crowdsourcing", during normal UE-BS communications. This in effect leverages the distributed and mobile nature of UEs in order to collect training datasets and label them using imperfect labelling algorithms. Existing infrastructure, rather than expensive and non-autonomous expert systems, is used in some embodiments to generate potentially noisier labelled data for training but at a much larger scale and in an uninterrupted manner instead of relying on availability of less noisy but much smaller amounts of labelled data from expert systems.

Dead Reckoning (DR) is the process of updating the location of a UE using inertial measurements that are made or collected by Inertial Measurement Units (IMUs) embedded inside Inertial Navigation Systems (INSs). In some implementations IMUs include micro electro-mechanical sensors that measure changes in capacitance in order to estimate line acceleration and angular velocity in three orthogonal directions. Such sensors are widely implemented in cell-phones, for example. IMUs have been extensively used in enabling various types of applications and calibrating cell-phone functionality, such as detecting screen rotation, fall detection, navigation in environments without Global Positioning System (GPS) availability, etc. In accordance with embodiments disclosed herein, UE inertial measurements, whether made or collected by an IMU or otherwise, are used in UE positioning determination as well.

In particular, some disclosed embodiments are intended to reduce UE positioning error or location estimation error due to NLoS error or bias. This is also referred to herein as corrected positioning determination. In some embodiments, a combination of readings of 3D IMU accelerations with biased estimates of range and location obtained over UEs' trajectories is used. GPS location estimates are also or instead used in some embodiments.

Figure 2:
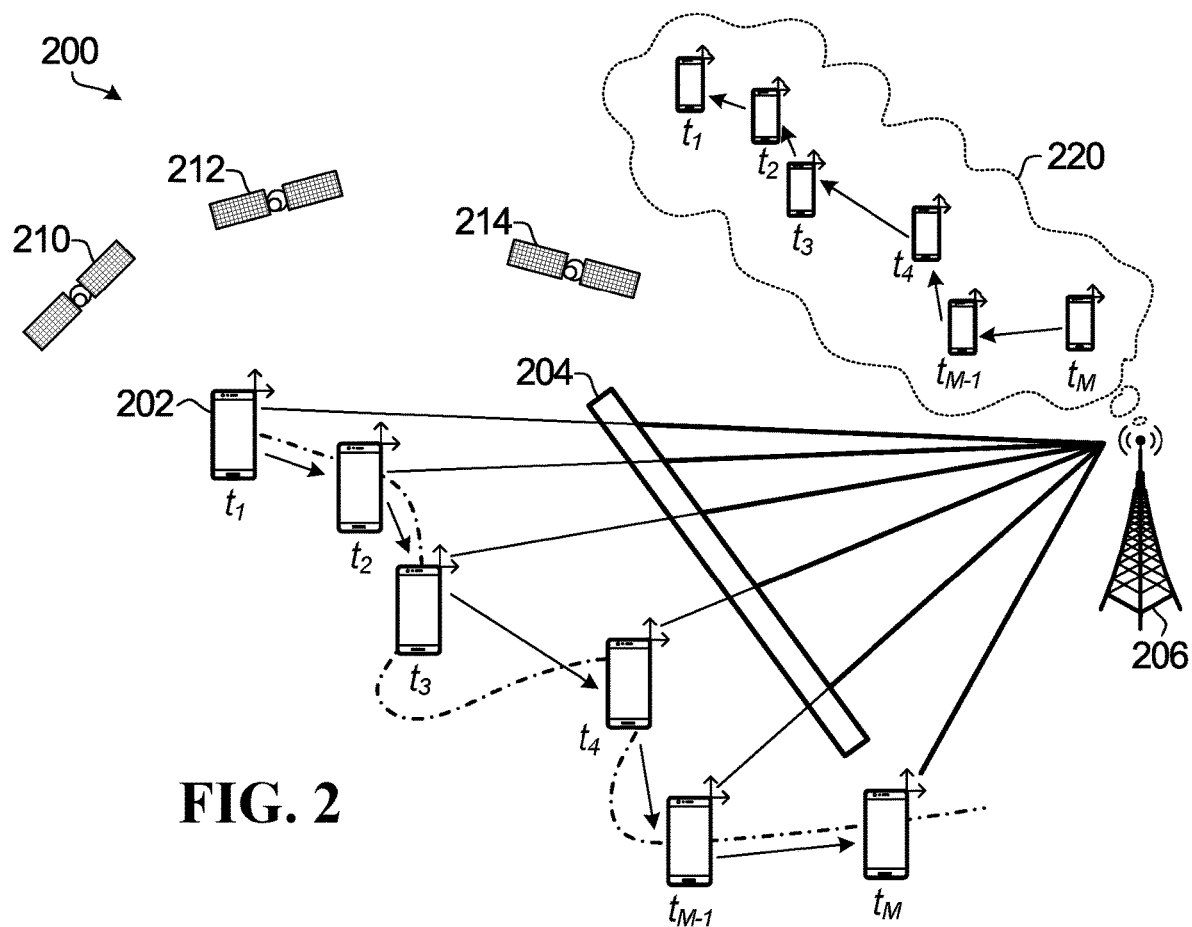
FIG. 2 is a block diagram illustrating another example wireless communication network, and UE backtracking according to an embodiment.

The general idea of UE positioning determination according to one embodiment is represented in FIG. 2, which is a block diagram illustrating another example wireless communication network 200, and UE backtracking. The wireless communication network 200 in FIG. 2 includes a UE 202 and a BS 206. Examples of a UE and a BS are provided elsewhere herein. An obstacle 204 in the operating environment of the UE 202 is also shown. Backtracking of UE position is represented as a cloud at 220.

A wireless communication network may include more than one UE, more than one BS, and/or more than one obstacle. A single UE 202, BS 206, and obstacle 204 are shown in FIG. 2 as a simple and non-limiting example. Features as described with reference to the UE 202 and the BS 206 may also be applied to other UEs and BSs. GPS satellites 210, 212, 214 are also shown in FIG. 2.

In FIG. 2, the UE 202 moves along a trajectory between different locations at times $t_1$ to $t_M$. ToFs $\hat{\tau}$, AoAs including zenith angle $\hat{\theta}$ and azimuth angle $\hat{\phi}$ in 3D space, and displacements $\Delta r$ are measured or otherwise determined by the UE 202 at each of its M different locations and relayed to the BS 206 in the example shown. Although only a BS 206 is shown in FIG. 2, information that is indicative of or based on the ToFs, AoAs, and displacements is further relayed to a positioning server and/or other network equipment in some embodiments. ToFs, AoAs, and displacements may be measured or otherwise determined according to any of various known techniques. For example, displacements may be determined using acceleration readings, and/or GPS location estimates in the example shown in FIG. 2.

Figure 3:
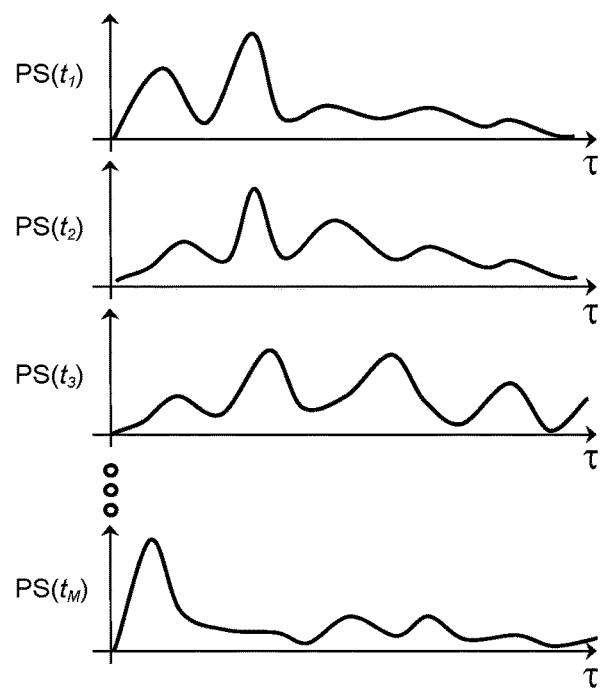
FIG. 3 illustrates plots of pseudospectrum (PS) corresponding to several of the UE positions in FIG. 2.

For most of the trajectory in FIG. 2, range estimation at the UE 202 is biased due to the heavy blockage by the obstacle 204. At time $t_M$ there is a LoS link between the UE 202 and the BS 206. Any of various techniques may be used to identify or detect a UE transition to a LoS link or LoS communications from an NLoS link or NLoS communications. For example, FIG. 3 illustrates plots of PS, versus delay $\tau$, corresponding to several of the UE positions in FIG. 2. In an embodiment, the PSs corresponding to time-adjacent UE positions are compared to detect the sharpest drops after a trend of several PSs with highest peak(s) at the same delay. A drop of at least a threshold value in one or more of the highest peaks between one PS and a next PS in time may be detected as a transition from NLoS to LoS. More generally, a change of at least a threshold value following a trend in at least a minimum number of PSs corresponding to time-adjacent UE positions is detected as a transition from NLoS to LoS in some embodiments. Although one example above refers to a drop of a threshold value, an increase of a threshold value may also or instead be used for NLoS to LoS transition detection. Other LoS identification techniques may be used in other embodiments to detect a transition from NLoS to LoS. Transitions from LoS to NLoS may also or instead be detected, in forward tracking embodiments for example.

Once a LoS link is detected at time $t_M$, the location $r_{t_M} = (x_{t_M}, y_{t_M}, z_{t_M}) \in R^3$ is estimated from unbiased LoS range/angle estimates $\{\hat{\tau}_j(t_M), \hat{\theta}_j(t_M), \hat{\tau}(t_M)\}_j$. Due to the fact that NLoS range and angular biases are zero for the LoS link at $t_M$, or in symbol notation $\{l_j(t_M), r_j^\theta(t_M), r_j^\phi(t_M)\}_j = 0$, the location estimate $r_{t_M}$ is unbiased. The BS 206, or a positioning server or other network equipment to which ToFs, AoAs, and displacements from the UE 202 are provided, then performs backtracking (in time) as illustrated at 220, to determine UE locations on the already traversed trajectory, in reverse order. For example, the location of the UE 202 at time $t_{M-1}$ ca be determined using the following vector equation: $r_{t_{M-1}} = r_{t_M} - \Delta r_{t_{M-1},t_M}$ where $\Delta r_{t_{M-1},t_M} \in R^3$ is a displacement vector calculated from IMU readings of accelerations at time $t_{M-1}$. Two consecutive GPS location estimates may also or instead be used in some embodiments. LoS-anchored range and angle estimates for that UE location can also be calculated according to $$\begin{cases} \tilde{\tau}_j(t_{M-1}) = |r_{t_{M-1}} - r_j^{BS}|_2 \\ \tilde{\theta}_j(t_{M-1}) = \tan^{-1}(|\langle r_{t_{M-1}} - r_j^{BS}, (1,1,0)\rangle|_2 / \langle r_{t_{M-1}} - r_j^{BS}, (0,0,1)\rangle) \\ \tilde{\phi}_j(t_{M-1}) = \sin^{-1}(\langle r_{t_{M-1}} - r_j^{BS}, (0,1,0)\rangle / |\langle r_{t_{M-1}} - r_j^{BS}, (1,1,0)\rangle|_2) \\ \forall j = 1 \ldots N_{BS} \end{cases}$$

where $r_j^{BS}$ is the known location of jth BS, $|\bullet|_2$ is the norm 2 operation, $\langle \bullet, \bullet \rangle$ is the inner product operation, and $N_{BS}$ is the total number of BSs. Given this alternative LoS-anchored estimation of ranges and angles at location $t_{M-1}$, angular and delay biases $\{l_j(t_{M-1}), r_j^\theta(t_{M-1}), r_j^\phi(t_{M-1})\}_j$ at time $t_{M-1}$ can be obtained from all BSs as follows:

$$\tilde{l}_j(t_{i-1}) = \tilde{\tau}_j(t_{i-1}) - \hat{\tau}_j(t_{i-1})$$

$$\tilde{r}_j^\theta = \tilde{\theta}_j(t_{i-1}) - \hat{\theta}_j(t_{i-1})$$

$$\tilde{r}_j^\phi(t_{i-1}) = \tilde{\phi}_j(t_{i-1}) - \hat{\phi}_j(t_{i-1})$$

This process is repeated for all of the NLoS time points $t_{M-2}, t_{M-3}, \ldots t_1$, to backtrack UE locations to the beginning of the NLoS trajectory.

The error estimates $\{\tilde{l}_j(t), \tilde{r}_j^\theta(t), \tilde{r}_j^\phi(t)\}$ are then used for corrected positioning determination. For example, the error estimates may be used as labels, with channel data that was collected at each location between a $j^{th}$ BS and a UE as inputs, to train a Deep Neural Network (DNN) and/or another form of ML module or AI component to be able to generalize to unseen locations. This is expected to be an effective approach because hidden factors in a UE operating environment that cause NLoS bias are limited in number, and therefore there is expectedly a high correlation between the large scale NLoS bias parameter that is observed at nearby locations.

In an embodiment, a model is trained with these error estimates as labels to enable (i) estimation of NLoS biases for unvisited/unseen locations by exploiting the innate ability of neural networks to generalize, and (ii) smoothing out of labelling noise that is caused by the uncertainties involved in measuring accelerations and angular velocity of UEs (due to potential faultiness of inertial measurements using non-carrier-grade Micro Electro-Mechanical Sensor (MEMS) technology for example) at different locations by exploiting the ability of neural networks to learn from noisy labels.

This type of backtracking method for generating or determining NLoS bias is expected to work because the cumulative error introduced by IMU readings tends to be more contained or constrained in comparison with error due to NLoS.

The following pseudocode provides a detailed example of backtracking-based data preprocessing algorithm.

```
𝒯 = {};
While area_covered = 0
    k = 0
    While Flag_LoS = 0
        k++
        Flag_LoS = 1
        For j = 1: N_BS
            Estimate ranges τ̂_j(t_k) and angles θ̂_j(tk),φ̂_j(t_k) from h_j(t)
            If IMU == 1
                Read/record accelerations a_{t_k} = (a_x(t_k), a_y(t_k), a_z(t_k))
                Calculate displacement Δr_{t_{k-1},t_k} = ∫_{t_{k-1}}^{t_k} ∫_{t_{k-1}}^{t_k} a_t dt
            Elif GPS == 1
                Derive GPS-based location q_{t_k} of user at time t = t_k
                Calculate displacement Δr_{t_{k-1},t_k} = q_{t_k} - q_{t_{k-1}}
            End
            Run LoS identification module: c_j = IdentifyLoS (h_j(t_{1:k}))
            Flag_LoS = Flag_LoS · c_j
        End;
        If Flag_LoS = 1
        Estimate location at the LoS spot
        r_{t_k} = MLE ({τ̂_j(t_k), θ_j(t_k), φ̂_j(t_k)}_j)
            l̃_j(t_k) = 0; r̃_j^θ (t_k) = 0; r̃_j^φ (t_k) = 0
            For i = k: 1
                For j = 1: N_BS
                    r_{t_{i-1}} = r_{t_i} - Δr_{t_{i-1},t_i}
                    τ̃_j(t_{i-1}) = |r_{t_{i-1}} - r_j^{BS}|_2, where
        r_j^{BS} = (x_j, y_j, z_j) is jth BS ground-truth location
                    θ̃_j(t_{i-1}) = tan^{-1} (⟨ r_{t_{i-1}} - r_j^{BS}, (1,1,0)⟩ |_2 /⟨ r_{t_{i-1}} - r_j^{BS}, (0,0,1)⟩ )
                    φ̃_j(t_{i-1}) = sin^{-1} (⟨ r_{t_{i-1}} - r_j^{BS}, (0,1,0)⟩ /|⟨ r_{t_{i-1}} - r_j^{BS}, (1,1,0)⟩ |_2)
                    NLoS range bias: l̃_j(t_{i-1}) = τ_j(t_{i-1}) - τ̃_j(t_{i-1})
                    NLoS zenith angle bias: θ̃_j(t_{i-1}) = θ_j(t_{i-1})
                    NLoS azimuth angle bias: r̃_j^φ(t_{i-1}) = φ_j(t_{i-1}) -
        φ̃_j(t_{i-1})
                End;
                Find the Covariance tensor of channel data x_j(t_{i-1}) =
        𝔼⟨ h_j(t_{i-1})h_j(t_{i-1})^H⟩
                    nnInput = {x_j(t_{i-1})}_j
                nnOutput ={l̃_j(t_{i-1}), r̃_j^θ(t_{i-1}), r̃_j^φ(t_{i-1})}
                    𝒯 = 𝒯 ∪ [nnInput, nnOutput]
            End;
        End;
    End;
End;
```

In the above pseudocode, training data is collected in the outermost "While" loop until sufficient data is collected. Since data collection depends on communication of UE inertial measurements in the uplink (UL) direction, in practical terms this might not be a completely constant process. Data collection may depend, for example, on whether or not training or retraining is needed, so that UEs can stop sending measurements unless and until training or retraining is being performed. The second "While" loop is for each trajectory for each UE, and will continue until a LoS point is identified for that UE. This corresponds to $t_M$ in FIG. 2, for example. In the meantime, in the first "For" loop, UEs record their line acceleration information and calculate their displacements, which are also communicated to a BS or other network equipment. Once an LoS point is identified, by the "Run LoS identification module" section in the above example, the inertial information and the range/angle measurements are fused, at the network side, to get NLoS angle and range biases. These biases are then paired with the corresponding channel tensors at each location, to form an entry of the training set T.

This example illustrates that inertial measurements and/or GPS measurements may be used in some embodiments. See the "If" and "Elif" conditional statements in the first "For" loop. The "If IMU==1" conditional statement may check for IMU existence in a UE, but IMU existence does not necessarily mean that IMU measurements will actually be used. IMU measurements may be preferred in some circumstances and GPS data may be preferred in others. As an example, when the goal is NLoS bias mitigation in indoor environments where a GPS signal cannot effectively penetrate concrete walls, IMU may be used. Alternatively, when a UE is moving outdoors, GPS may be used in correcting cellular range/angle data. Although the present disclosure focuses primarily on inertial measurements, GPS data may also or instead be used in some embodiments.

Figure 4:
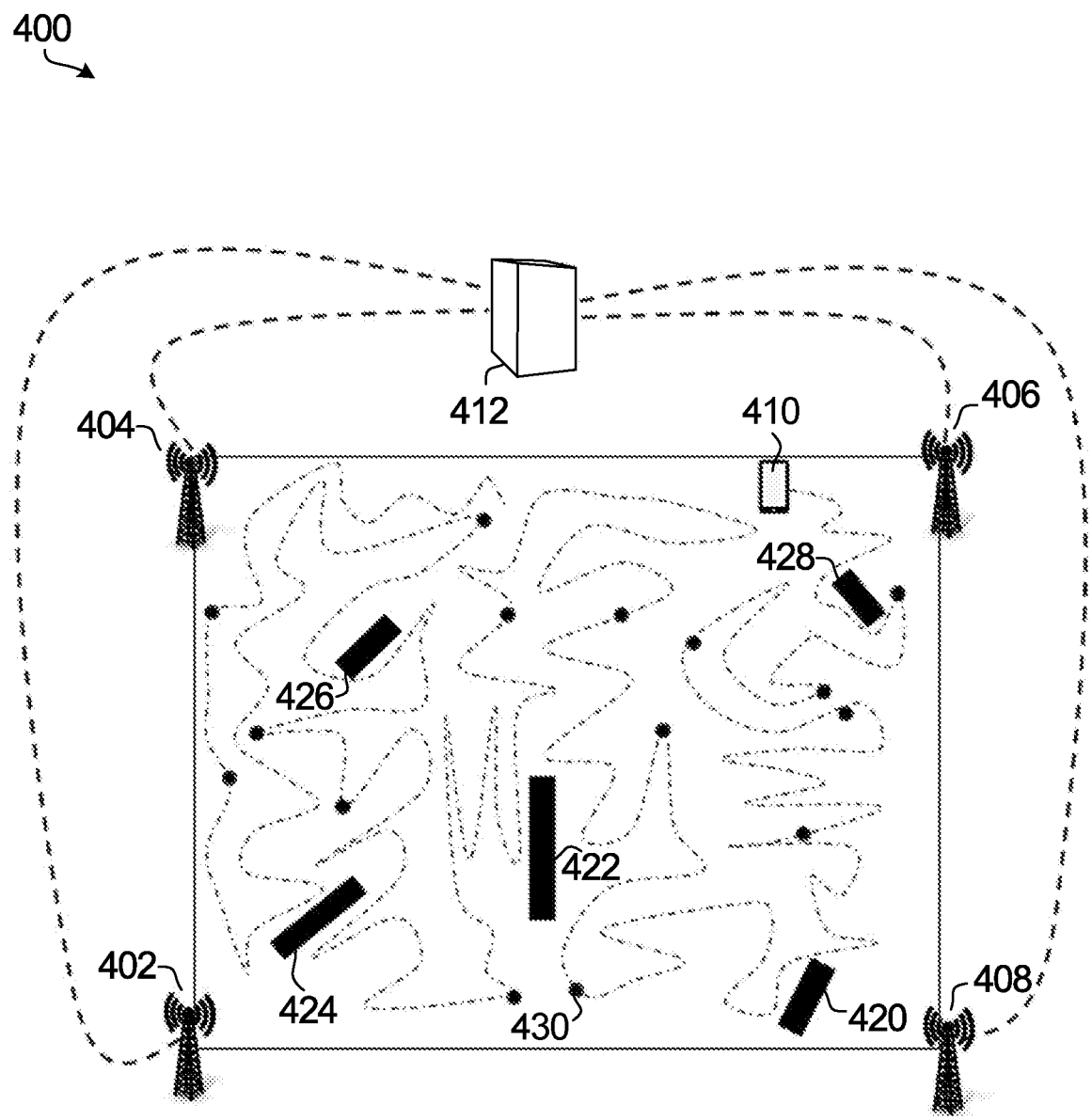
FIG. 4 is a block diagram illustrating another example wireless communication network, including a positioning server according to an embodiment.

FIG. 4 is a block diagram illustrating another example wireless communication network 400 illustrating a wider view with several BSs 402, 404, 406, 408 and a UE 410, and also a positioning server 412 according to an embodiment. This figure shows several trajectories as the UE 410 moves in the environment encountering intermittent LoS→NLoS and NLoS→LoS conditions. Obstacles are shown at 420, 422, 424, 426, 428.

The positioning server 412 is an example of network equipment by which features disclosed herein may be provided in some embodiments, and includes at least a transmitter and receiver to support communications with at least the BSs 402, 404, 406, 408, and a processor and/or other components configured to support corrected UE positioning determination. The positioning server 412 is also an example implementation of a Location Management Function (LMF).

In the deployment scenario represented in FIG. 4, the UE 410, while moving in the environment, communicates its IMU and/or possibly GPS measurements through its serving cell BS 402, 404, 406, 408 to the backend positioning server 412. Reference signaling for channel estimation, such as Synchronization Reference Signal (SRS) transmissions sent by the UE 410, is received by all the in-range BSs 402, 404, 406, 408, which perform channel estimation and forward channel coefficients to the positioning server 412 in the example shown. Note that range/angle estimation may potentially be performed in downlink (DL) using Positioning Reference Signal (PRS) signaling, but this would add significant overhead of communicating angle/angle estimates along with the true channel tensors to the positioning server 412, which is where training and location estimation is to take place in the example shown.

More generally, IMU and/or possibly GPS data, as well as channel data, are forwarded to an LMF, which is implemented at the positioning server 412 but may also or instead be implemented elsewhere. The LMF processes the received data to find less biased range estimates as well as NLoS biases at different locations. In some embodiments, the LMF uses backtracking from LoS locations, which are shown as points 430 in FIG. 4. The LMF also forms a set or database $\mathcal{T}$ of training data, along with channel data from channel estimation, to be used in some embodiments to train a model for predicting angular and range estimation biases. The model is trained to predict these biases based on subsequently estimated channel data for the same UE 410 and/or one or more other UEs in the wireless communication network 400.

For the purposes of data collection, the UE 410 may be operating normally and engaged in communications with any of the BSs 402, 404, 406, 408 as it moves throughout the network 400. In a sense, the UE 410 can be used by an LMF as a calibrating terminal even though the operations of the UE are not limited only to calibration or data collection during collection of data by the LMF. In general terms, in the uplink direction, reference signaling in the form of SRSs in some embodiments, is received by a jth BS, from which the channel tensor $h_j$ is derived. The channel tensor, also referred to herein as channel coefficients, is transformed to covariance domain $x_j$ in some embodiments and is then relayed to the positioning server 412 to perform range/angle bias estimation. The UE 410, and other UEs (not shown), also relay IMU measurements, and/or possibly GPS measurements. The positioning server 412 processes received information, continuously in some embodiments, to identify LoS landmarks, shown as points 430 in FIG. 4, from which UE positions are backtracked and NLoS bias errors on the trajectory between two LoS landmarks are determined.

Figure 5:
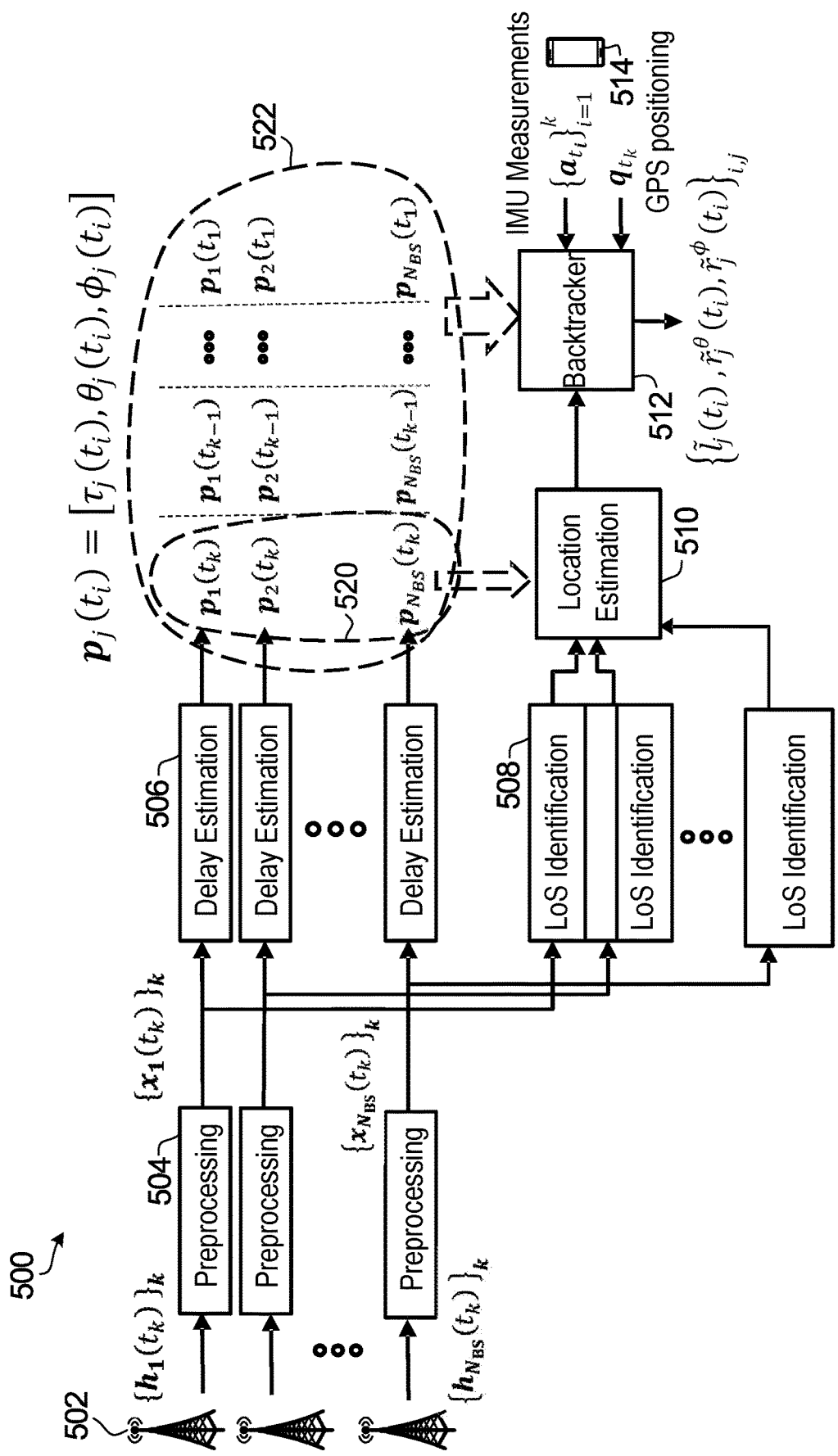
FIG. 5 is a functional block diagram illustrating backtracking-based data collection according to an embodiment.

FIG. 5 is a functional block diagram 500 illustrating backtracking-based data collection according to an embodiment. In FIG. 5, BSs are shown at 502 and a UE is shown at 514. Various functions are represented as blocks 504, 506, 508, 510, 512. Preprocessing at 504 is implemented at each base station 502 in some embodiments, or at other network equipment in other embodiments. Generating covariance domain channel data from estimated channel coefficients is one example of preprocessing at 504. Delay or range estimation at 506, LoS identification at 508, location estimation at 510 based on LoS identification at LoS landmarks using any classic localization method, and a backtracker function at 512 may be provided in an LMF, at a positioning server, at one or more BSs, and/or at other network equipment. 520 is intended to represent that location estimation is performed at 510 after detection of an LoS landmark at 508, and 522 is intended to represent that backtracking data is applied to the whole data set that was collected along an NLoS trajectory in some embodiments.

One attractive aspect of this type of approach to data collection is that the data collection can be nearly transparent to UEs, apart from communication of IMU measurements and possibly GPS measurements. Therefore, there is no separate and laborious offline fingerprinting using a separate expert system. A data set or database is populated through UE crowdsourcing while UEs continue to perform their regular communications workload and functions. In fact, with many UEs within a coverage area, a large training set can quickly be formed, for example within hours of operation of a network.

Some embodiments disclosed herein use ML, AI, or NN training for predicting NLoS errors or biases for the purposes of corrected UE positioning determination. Although such training is not necessarily used in every embodiment, there are underlying reasons for training an NN instead of other classic learning algorithms to predict NLoS errors.

For example, NNs have an innate ability to learn underlying factors of variations within data. What this means is that NNs do not just memorize a data set but rather learn internal representation of data, or internalize such data. This in turn means that NNs have the ability to generalize to unseen data having previously seen similar patterns during training. As such, NNs are able to learn from coarser or less extensive fingerprints than other classic learning algorithms, which can reduce the burden of fine fingerprinting that other learning algorithms may require.

Not using an expert system to generate labeled data for training may induce labelling noise. However, noisy labelled data does not necessarily impact the generalizability of NNs proportional to the additional induced noise, and therefore even noisy labeled data is not expected to be detrimental to learnability in NN-based implementations.

With a data set $$\mathcal{T} = \left[\left[x_j(t_{i-1}), \left[\tilde{l}_j(t_{i-1}), \tilde{r}^\theta_j(t_{i-1}), \tilde{r}^\phi_j(t_{i-1})\right]\right]_j\right]_i$$

being continuously created as time passes, training or subsequent retraining of an NLoS prediction bias model can be performed. In this data set notation, the index i is a time index and indicates that data is collected at different times while a UE is moving.

A DNN is trained and/or retrained using such a data set and a Mean-Square-Error (MSE) loss function in some embodiments. To enable learning without overfitting, set $\mathcal{T}$ is partitioned in some embodiments into multiple disjoint sets for training, testing, and cross-validation. Partitions of 70%, 20%, and 10% of the set may be used, for example. Other partitioning is also possible. Although in general it is preferable to have no leakage from the training set into the test set, in some embodiments such as embodiments in which the initial data set is established through UE crowdsourcing, it may be viable to have duplicated data samples from the training data set leaked into test and/or cross-validation sets, if UEs probe the same channel multiple times, for example. While a certain level of leakage may be completely acceptable, this should not be a systematic behavior. It is expected that data collection will involve many UEs that are moving in different directions and exhibiting independent behaviours, and therefore leakage should not be an issue. However, it is possible that certain scenarios, such as UEs that are vehicles or are in vehicles moving along a given road and sampling substantially the same channel at a given location, will be more prone to significant leakage between partitions. Therefore, in some embodiments, duplicate data that appears in multiple partitions is detected. Such duplicate data may be removed from all partitions, or maintained in one partition such as a training partition and removed from all others. This represents an example of detection and elimination of systematic leakage.

Data from multiple BSs, and potentially all BSs, is collected and used for training in some embodiments. If the lack or presence of LoS between a UE and each BS were independent events, then an independent NN could be trained for each BS-UE link, for example. However, shadowing objects close to a UE can potentially obstruct LoS links to several BSs simultaneously. Joint processing of collected data, in a backend server such as the positioning server 412 in FIG. 4 or in a BS or other network equipment to which multiple BSs relay channel estimation results and data from UEs for example, may therefore be preferable.

The following is an example of an MSE loss function:

$$\mathcal{L}(W) = \sum_{i=1}^{|\mathcal{T}|} |f_W(x(t_i)) - \tilde{b}(t_i)|_2^2$$

where $\tilde{b}(t_i) = \text{vec}(\tilde{l}_j(t_i), \tilde{r}_j^\theta(t_i), \tilde{r}_j^\phi(t_i), \forall j) \in \mathcal{R}^{3N_{BS} \times 1}$ represents the delay and angle biases for all BSs in vectorized format. In an embodiment, this function is optimized for unknown weights W at different layers of the NN by solving $$\hat{W} = \min_W \mathcal{L}(W)$$

where $\check{b}(t) = f_W(x(t_i)) \in \mathcal{R}^{3N_{BS} \times 1}$ is the output of NN with unknown weights W to input $x(t_i)$. In this example actual channel tensors or coefficients $h(t_i)$ are not used. The input $x(t_i)$ is a version of $h(t_i)$ that has been preprocessed, to reduce or eliminate synchronization errors and Small Scale Phase (SSP) for example. This is often best captured by the cross-covariance tensor of the channel, which is represented herein by x.

Solving the weight function above with the loss function above is extremely memory intensive. Therefore, in some embodiments Stochastic Gradient Descend (SGD) with several mini-batches of the training data with smaller size can be used. To solve the above optimization problem, back-propagation can also or instead be used. Different NN architectures such as Convolutional NNs (CNNs) and Feed-forward NNs (FFNNs) are possible. NN parameters such as number of layers, number of neurons in each layer, learning rate, dropout rate, and/or regularization coefficient may be chosen based on any of various criteria, including trial and error to find a preferred parameter set.

Figure 6:
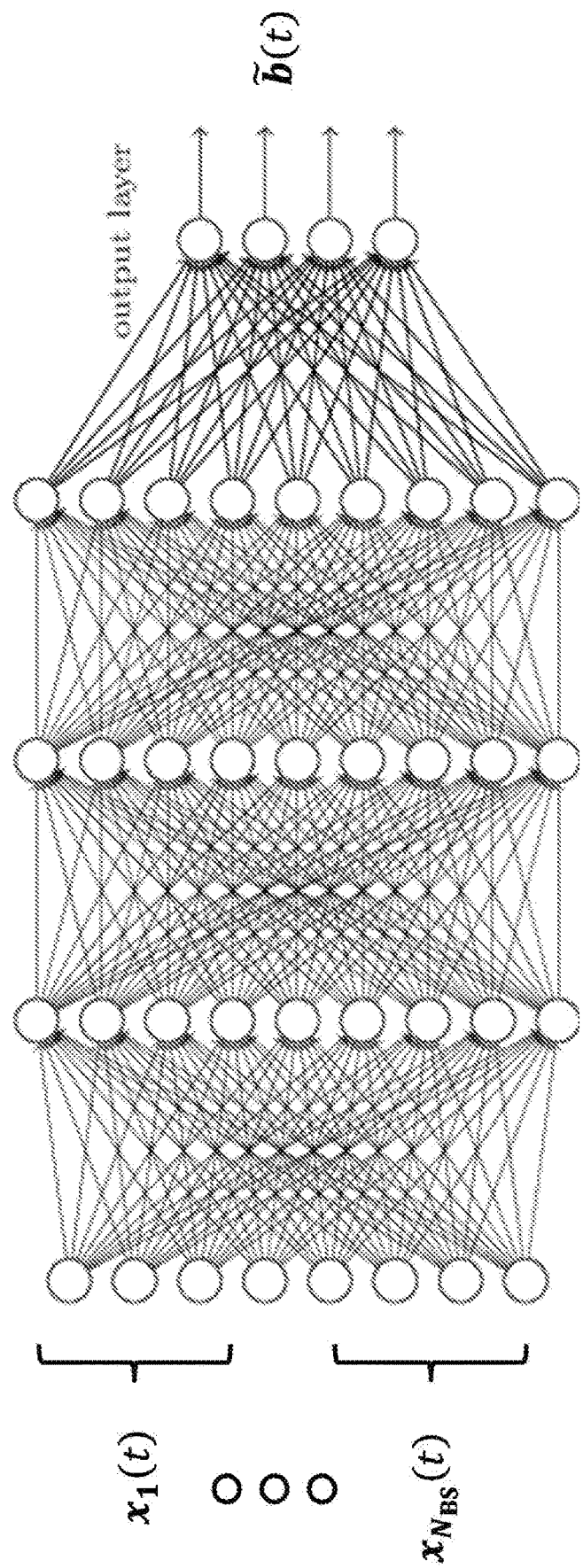
FIG. 6 is a schematic diagram of an example Feedforward Neural Network (FFNN) according to an embodiment.

FIG. 6 is a schematic diagram of an example FFNN according to an embodiment. In FIG. 6, inputs are shown at the left, outputs are shown at the right, neurons are shown as circles, branches are shown as lines, and layers are arranged by column. Although an FFNN as shown in FIG. 6 may be trained using collected training data and used to predict NLoS bias as disclosed herein, this is just an illustrative example. Other NNs may be used in other embodiments, such as CNNs.

A trained model can be used, for example, to estimate NLoS range/angle biases $\check{b}_1 \ldots \check{b}_{N_{BS}} = f_{\hat{W}}(h(t_i))$, for both UL and DL positioning if there is channel reciprocity of the wireless channel. For example, in an embodiment an instantaneous Multiple Input Multiple Output (MIMO) channel between a transmitter A and a receiver B, denoted by $h^{AB}$, is related to the channel between B and A, denoted by $h^{BA}$, by the relation $h^{BA} = (h^{AB})^T$ where $(\ )^T$ is the transpose operator. As an implication of this reciprocal property of the channel, according to which the multipath channel profile in UL and DL directions is the same, the NLoS range and angle biases in both directions should also be the same. Therefore, in some embodiments the same model that was trained based on uplink signaling such as SRS signaling can be directly exploited by a UE, using downlink signaling such as PRS signaling to determine a channel tensor $h_j$ to be used as input, possibly after preprocessing to generate a cross-covariance tensor for example.

A model may be defined at least in part in a large database of weights, which may be hundreds of Megabytes to several tens of Gigabytes depending on the capacity of the model. Due to changes in environment caused by such factors as mobility and/or phase-in/phase-out of obstacles such as signal scatterers and reflectors, periodic retraining may be preferred in wireless applications. Although a model may be broadcast or otherwise transferred to UEs in some embodiments to enable UEs to perform corrected positioning determination, it may be impractical to transfer the entire model to each UE every time the model is retrained.

Fortunately, the operating environment in a wireless communication network does not typically change so abruptly as to require full retraining. In some embodiments, a model is retrained with only limited batches of online retraining data. For example, retraining data may be collected only from certain coverage areas that are known or expected to have changed, or only retraining data that is expected to modify some but not all of the NN weights in the model may be collected. Even full retraining using data collected from an entire coverage area is unlikely to change every weight in a model. As such, a positioning server or other network equipment can send to UEs only those weights that changed, or changed significantly by more than a threshold amount, along with the positions of those particular weights in the NN model. This can significantly reduce the burden of communicating a large NN model to every UE every time the model is retrained.

Thus, in some embodiments, a full trained model is distributed to UEs only once, and thereafter only changes are distributed to the UEs after retraining.

In an inference or operating stage after training or retraining, in some embodiments a UE or LMF uses a trained or retrained model to estimate range/angle biases $\check{b}_1 \ldots \check{b}_{N_{BS}} = f_{\hat{W}}(x_1 \ldots x_{N_{BS}})$ where $\check{b}_j = [\check{l}_j, \check{r}_j^\theta, \check{r}_j^\phi]$ is the output of the trained model for a jth BS and $x_1 \ldots x_{N_{BS}}$ are covariance tensors obtained from reception of DL/UL reference signaling such as SRS or PRS signaling. Channel tensors obtained from reception of the same reference signaling are also used to estimate ranges and angles $\hat{\tau}_j, \hat{\theta}_j, \hat{\phi}_j, \forall j = 1 \ldots N_{BS}$ using classic range/angle estimation methods. UE positioning is then determined based on the range/angle biases and the range/angle estimates. For example, this may involve solving a Maximum Likelihood Estimation (MLE) problem to determine the most likely position of the UE.

Several different embodiments are envisioned to integrate aspects of the present disclosure into network architecture, depending on whether bias and location inference is to be performed by UEs, or at a network side such as by an LMF.

It is expected, however, that training using network resources will generally be preferred, given that training can be an extremely resource-intensive process that is not particularly suited to UEs with more limited power, computation resources, and memory.

Three illustrative embodiments are summarized in the following table:

| | Bias Inference at: | Position Estimation at: |
|---|---|---|
| 1 | Network | Network |
| | Embodiment 1 may be preferable for UE battery efficiency by avoiding inferencing at the UE, for high network resource efficiency in that no feedback is provided to a UE for position estimation by the UE, and/or for speed of position estimation, again because no feedback is provided to a UE for position estimation by the UE. UE position may be available at a remote point, namely at the LMF or network equipment that determines UE position. | |
| 2 | Network | UE |
| | Embodiment 2 avoids UE battery consumption for inferencing, but sacrifices network resource efficiency and speed relative to embodiment 1 because biases are fed back to a UE for position estimation. However, UE-determined positioning based on PRS signaling for example, may be more accurate than network-based UE positioning determination if PRS power is higher than SRS power, it occupies larger bandwidth than SRS, and/or PRS inter-cell interference is lower than SRS interference due to PRS muting mechanism, for example. In embodiment 2, although a model is known at network equipment, UE position is estimated at the UE itself, which is potentially more secure than embodiment 1 and offers more accuracy due to more potent resources and better interference controllability that is available in DL. | |
| 3 | UE | UE |
| | Embodiment 3 is potentially the most secure of embodiments 1 to 3, because the model is known at the UEs and UE location is estimated at UEs. UE positioning may also be more accurate, as outlined above for embodiment 2. However, embodiment 3 is the least UE power efficient and has lower network resource efficiency than embodiments 1 and 2 due to distribution of the model by broadcasting the model to UEs for example, and/or changes to UEs after training / retraining. | |

Figure 7:
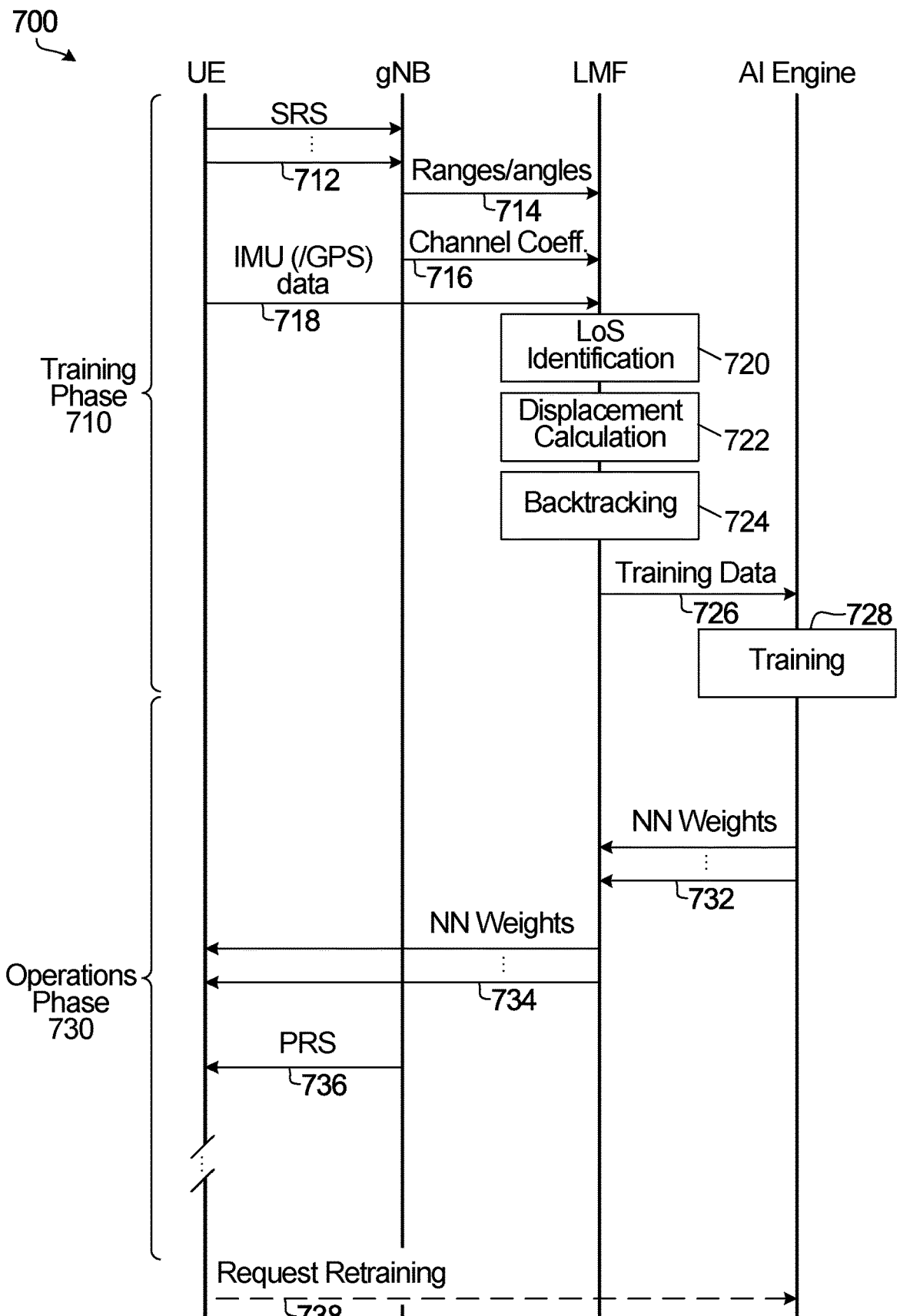
FIG. 7 is a signal flow diagram illustrating signaling according to an embodiment.

FIG. 7 is a signal flow diagram illustrating signaling according to an embodiment. Solely for illustrative purposes, the signal flow diagram 700 in FIG. 7 relates to signaling in embodiment 3. Other embodiments may involve similar signaling, at least during initial stages of training for example.

In the signal flow diagram 700, a UE, a gNodeB (gNB), an LMF, and an AI engine are involved in a training phase 710. The gNodeB, the LMF, and the AI engine are network-side components, and may be implemented together in network equipment or separately. Although only one UE and only one gNB are shown in FIG. 7 to avoid congestion in the drawing, data collection during training is expected to involve more than one UE and more than one gNB.

Reference signaling from the UE, in the form of SRS signaling for example, is shown at 712. Such reference signaling may be received by the gNB, and/or other network equipment, from the UE and/or other UEs in a wireless communication network. Based on the reference signaling, the gNB calculates UE ranges and angles using SRS in UL in some embodiments, as well as channel coefficients, and transmits signaling to the LMF at 714, 716. The UE may perform range/angle estimation with PRS in DL, and calculate channel coefficients, in other embodiments.

The calculated parameters, or information based on such parameters, may be included in the signaling at 714, 716. For example, the gNB may preprocess determined channel tensors to generate covariance tensors, and transmit information indicative of the covariance tensors at 716. At least in the sense that the signaling to the LMF at 714, 716 is in some way based on the reference signaling from the UE at 712, the signaling to the LMF is associated with the reference signaling and/or channel estimation. Actual reference signals and channel estimates need not be included in the signaling to the LMF, but may still be considered as being associated with the reference signaling and/or channel estimation.

IMU data, and possibly GPS data, are also signaled to the LMF at 718 by the UE in the example shown. This data may instead be transmitted to the gNB and preprocessed in some embodiments. Based on the signaling received at 714, 716, 718, the LMF performs LoS identification at 720, calculates displacement at 722, and performs backtracking at 724. Examples of these operations are provided elsewhere herein. In some embodiments, these operations are performed in a different order than shown, although as disclosed herein backtracking is anchored at LoS landmark positions in some embodiments and therefore at least backtracking is performed after LoS identification.

At 726, a training data set that is compiled by the LMF based on the signaling received at 714, 716, the LoS identification at 720, the displacement calculation at 722, and the backtracking at 724, is signaled to the AI engine. That training data set is used in training an NN-based model at 728. NN weights are signaled to the LMF at 732. In the embodiment shown, the NN weights are also signaled to the UE at 734, and may be broadcast to all UEs. It should be noted that not all embodiments involve inferencing at UEs and therefore NN weights need not necessarily be signaled to a UE in all embodiments.

For embodiment 3, the operations phase 730 involves positioning determination by the UE based on reference signaling from network, shown by way of example as PRS signaling from the gNB at 736.

Signaling to request retraining at 738 is optional. A UE may request retraining based on any one or more of: a threshold amount of time since previous training or retraining, movement of the UE by more than a threshold distance, an error detection rate above a threshold, and/or any of various other factors. Retraining may be initiated at the network side, by the LMF for example, based on these and/or other factors. In the case of network-initiated retraining, retraining need not be requested by a UE. Embodiments in which retraining may be network-initiated and UE-initiated are also possible.

Retraining may proceed in much the same manner as shown in FIG. 7, although in the case of retraining it is possible that only changed NN weights and their locations within the model are signaled to the UE at 734 and/or to the LMF at 732. NN weights before and after retraining may be compared, by the LMF for example, to detect changed weights or weights that have changed by more than a threshold amount, to be signaled to UEs.

Other variations in FIG. 7 are also possible. For embodiment 1 referenced above, for example, NN weights need not be distributed to the UE because inferencing is performed at the network side, by the LMF in the example in FIG. 7. During the operations phase for embodiment 1, the UE transmits reference signaling such as SRS signaling to the gNB, which determines and signals ranges/angles and channel tensors or covariance tensors to the LMF, as shown at 712, 714, 716. The LMF then performs inferencing and positioning determination, and signals positioning information back to the UE.

For embodiment 2 referenced above, signaling at 712, 714, 716 may still be exchanged between the UE and the gNB and between the gNB and the LMF, but the LMF signals the determined biases back to the UE for position determination.

During the operations phase, even for embodiment 3 in which inferencing and position determination are performed at UEs, the UEs may still transmit reference signaling and IMU/GPS data as shown at 712, 718. The gNB may similarly still determine ranges/angles and channel tensors and send signaling to the LMF at 714, 716. Such signaling enables the LMF to continuously compile a training data set so that retraining can be performed without a delay that might otherwise be incurred during collection of data for retraining. The LMF may, for example, maintain a training data set of a certain size and discard the oldest data when maximum size is reached, maintain a training data set only for certain coverage areas, and/or maintain a data set with entries of up to a certain maximum age and discard older entries.

There are also various options for the signaling shown in FIG. 7. For example, IMU/GPS measurements are to be sent by UEs in uplink, to an LMF in some embodiments. Network equipment may advise each UE as to whether the UE is to communicate its IMU/GPS measurements and if so, on which communication resources. This may be done by allocating a portion of format 0 DCI in Physical Downlink Control Channel (PDCCH) to this task, for example. Each UE can use the common and dedicated search space in order to decode DCI to determine whether it is obliged to send its IMU/GPS measurements, and over which resources.

When an NN model is to be transferred to UEs, this may be done in by broadcast. To broadcast the model, which is expected to happen infrequently, UEs need to be able to determine the communication resources over which they can recover the model. Given the fact that NN models are expected to include millions of parameters, transmitting an entire model, or even a part of a model, model transfer might not be done through PDCCH due to the limitations of resources. One possible options is to use format 1 at DCI to inform UEs as to the resources, such as Resource Blocks (RBs), during which symbols will carry weights of a model so that each UE can recover the model. In one embodiment, once the model is available at UEs, inference is performed and inferred biases are to be sent to network equipment for the sake of positioning. To carry the inferred bias information to the network, Uplink Control Information (UCI) may be used to declare to the network equipment the resources, such as RBs and symbols, of a UE carry the bias information.

In another embodiment where inference using a model is instead done at network equipment but it is the UE that performs positioning (UE-side positioning), inferred bias information is unicast to each UE because the bias for each UE is different. Again, in some embodiments DCI may be used for sending PHY control information to the UE through Physical Downlink Shared Channel (PDSCH) containers for example.

Some disclosed embodiments may be summarized as providing a technique that involves backtracking, to estimate NLoS biases to different BSs. This technique may involve forming a training data set and generalizing to new unseen UE locations. In forming a training data set, IMU readings and/or GPS data, from IMUs and GPS components that are already integrated in 4G/5G chipsets, are used in conjunction with range/angle estimates from SRS/PRS, and raw SRS/PRS channel tensors or data based thereon. Detection of a LoS link triggers or initiates backtracking from an LoS anchor position to compile training data. Generalizing to new unseen locations involves training a DNN engine with the training data set in some embodiments.

In order to enable backtracking in some embodiments, each UE sends IMU and/or GPS data, such as nine Degrees of Freedom (9-DoF) IMU readings and/or GPS location estimates, to network equipment. The UEs may also transmit reference signaling for channel estimation, such as SRS signaling. At the network side, the network equipment and/or other equipment in the network measures or determines displacements $\Delta r_{t_{k-1},t_k}$, estimates ranges $\hat{\tau}_j$, zenith angle $\hat{\theta}_j$ and azimuth angle $\hat{\phi}_j, \forall j=1 \ldots N_{BS}$ from the UE reference signaling, and performs an LoS identification procedure, based on raw channel data at every UE location in some embodiments.

When LoS is identified or detected at a time point M, UE position $r_{t_M} \in R^3$ is estimated, from MLEstimate ($\{\hat{\tau}_j(t_k), \hat{\theta}_j(t_k), \hat{\phi}_j(t_k)\}_j$), for example. Backtracking in effect back-propagates belief to the beginning of a UE trajectory, such as by using $r_{t_{i-1}} = r_{t_i} - \Delta r_{t_{i-1},t_i}$, $i=M, M-1, \ldots 1$.

Alternative range/angle estimates are calculated or otherwise determined, based on the following in some embodiments:

$$\begin{cases} \tilde{\tau}_j(t_{M-1}) = |r_{t_{M-1}} - r_j^{BS}|_2 \\ \tilde{\theta}_j(t_{M-1}) = \tan^{-1}(|\langle r_{t_{M-1}} - r_j^{BS}, (1,1,0)\rangle|_2 / \langle r_{t_{M-1}} - r_j^{BS}, (0,0,1)\rangle), \\ \tilde{\phi}_j(t_{M-1}) = \sin^{-1}(\langle r_{t_{M-1}} - r_j^{BS}, (0,1,0)\rangle / |\langle r_{t_{M-1}} - r_j^{BS}, (1,1,0)\rangle|_2) \\ \forall j = 1 \ldots N_{BS} \end{cases}$$

As noted elsewhere herein, $r_j^{BS}=(x_j, y_j, z_j)$ is the ground-truth location of the BSs.

NLoS range/angle biases can then be calculated or otherwise determined, based on the following in some embodiments:

$\tilde{l}_j(t_{i-1}) = \tilde{\tau}_j(t_{i-1}) - \hat{\tau}_j(t_{i-1})$      NLoS range bias:

$\tilde{r}_j^\theta(t_{i-1}) = \tilde{\theta}_j(t_{i-1}) - \hat{\theta}_j(t_{i-1})$      NLoS zenith angle bias:

$\tilde{r}_j^\phi(t_{i-1}) = \tilde{\phi}_j(t_{i-1}) - \hat{\phi}_j(t_{i-1})$      NLoS azimuth angle bias:

and a sample is then added to the training data set $nn\text{Input} = \{x_j(t_{i-1})\}_j$ $nn\text{Output} = \{\tilde{l}_j(t_{i-1}), \tilde{r}_j^\theta(t_{i-1}), \tilde{r}_j^\phi(t_{i-1})\}_j$ $\mathcal{T} = \mathcal{T} \cup [nn\text{Input}, nn\text{Output}]$.

Backtracking is repeated in some embodiments until the beginning of a trajectory from a previous LoS location is reached, for i=1.

For model training, at a network server for example, a DNN is trained using the data set $$\mathcal{T} = \left[\left[h_j(t_{i-1}), \left[\tilde{l}_j(t_{i-1}), \tilde{r}_j^\theta(t_{i-1}), \tilde{r}_j^\phi(t_{i-1})\right]\right]_j\right]_i$$

and an MSE loss function in some embodiments:

$$\mathcal{L}(W) = \sum_{i=1}^{|\mathcal{T}|} |f_W(x(t_i)) - \tilde{b}(t_i)|_2^2$$

$$\tilde{b}(t_i) = vec(\tilde{l}_j(t_i), \tilde{r}_j^\theta(t_i), \tilde{r}_j^\phi(t_i), \forall j) \in \mathcal{R}^{3N_{BS} \times 1}$$

The DNN is trained with the data from all BSs in some embodiments, for j=1, . . . , $N_{BS}$. Training develops or obtains a model, expressed by way of example herein as:

$$\hat{W} = \min_W \mathcal{L}(W),$$

which may be sent to an LMF, for example, for UL positioning determination.

An incremental model (i.e. $\Delta\hat{W}$) is sent, by an LMF for example, to UEs for DL positioning in some embodiments where channel reciprocity exists.

For DL positioning, a UE receives network reference signaling such as PRS signaling, and estimates $h_j$, $j \in 1 \ldots N_{BS}$, as well as ranges and angles $\hat{\tau}_j$, $\hat{\theta}_j$, $\hat{\phi}_j$, $\Delta j=1 \ldots N_{BS}$. Based on $h_j$ or a processed version thereof, the UE obtains biases $\check{b}_1 \ldots \check{b}_{N_{BS}} = f_{\hat{W}}(h_1 \ldots h_{N_{BS}})$ where $\check{b}_j = [\check{l}_j, \check{r}_j^\theta, \check{r}_j^\phi]$, and in some embodiments solves a model-based positioning problem given $[\hat{\tau}_j, \hat{\theta}_j, \hat{\phi}_j, \check{b}_j]_j$ and using the following in some embodiments:

$$(x^*, y^*, z^*) =$$

$$\operatorname*{argmin}_{x,y,z} \sum_{t=1}^{T} \sum_{j=1}^{N_{BS}} \sigma_{\tau,j}^{-2} \cdot \left(\hat{\tau}_j(t) - \check{l}_j - \sqrt{(x - x_j)^2 + (y - y_j)^2 + (z - z_j)^2}\right)^2 +$$

$$\sigma_{\theta,j}^{-2} \cdot \left(\hat{\theta}_j(t) - \check{r}_j^\theta(t) - \tan^{-1}\left(\frac{\sqrt{(x^\circ - x_j)^2 + (y^\circ - y_j)^2}}{z^\circ - z_j}\right)\right)^2 +$$

$$\sigma_{\phi,j}^{-2} \cdot \left(\hat{\phi}_j(t) - \check{r}_j^\phi(t) - \sin^{-1}\left(\frac{y^\circ - y_j}{\sqrt{(x^\circ - x_j)^2 + (y^\circ - y_j)^2}}\right)\right)^2$$

For UL positioning, each $BS_j$, j=1 . . . $N_{BS}$ receives reference signaling such as SRS signaling from a UE and estimates channel coefficients $h_j(t)$. The channel coefficients, or information based thereon such as a processed version of $h_j(t)$, is either used by the BS or transmitted to an LMF or other component that is to perform prediction or inference for NLoS biases.

The NLoS biases $\check{b}_1 \ldots \check{b}_{N_{BS}} = f_{\hat{W}}(h_1 \ldots h_{N_{BS}})$ are inferred using a trained NN in some embodiments, and ranges and angles $\hat{\tau}_j$, $\hat{\theta}_j$, $\hat{\phi}_j$, from $h_j$, $\forall j=1 \ldots N_{Bs}$ are also estimated. Given $[\hat{\tau}_j, \hat{\theta}_j, \hat{\phi}_j, \check{b}_j]_j$ the above model-based positioning problem is solved in some embodiments.

UE position is then signaled to the UE in a DL signaling stream.

Various embodiments are described in detail above. Disclosed features may be implemented in any of various ways and/or in any of various subsets or combinations, as described by way of example below. FIG. 8A is a flow chart illustrating an example of a method performed by network equipment in an embodiment.

The example method 800 in FIG. 8A is intended to be illustrative of a method that may be performed at any of various types of network equipment. Consider, for example, the operation 804 of receiving signaling that is associated with channel estimation of a wireless channel for UE. This signaling may include reference signaling such as SRS signaling as shown at 712 in FIG. 7. In another embodiment of the method 800, the signaling received at 804 may include signaling indicative of ranges/angles and channel coefficients at 716 in FIG. 7. This signaling may instead include training data as shown at 726 in FIG. 7. These are all examples of signaling that is associated with channel estimation, at least in the sense that such signaling in some way related to channel estimation.

Similarly, the signaling associated with corrected positioning determination for the UE, transmitted at 806, may take any of various forms depending on the particular network equipment or element(s) by which the method 800 is being performed. This signaling may relate to distributing a model or changes in a model. In other words, the signaling at 806 may be indicative of one or more parameters of corrected positioning determination, or of one or more changes in one or more parameters of the corrected positioning determination, such as weights and locations in a model. Examples of such signaling are shown at 732 and 734 in FIG. 7.

The corrected positioning determination referenced at 806 is based on the signaling received at 804 and previous signaling by a UE. For example, current received signaling associated with channel estimation, may be used to determine corrected positioning of the UE based on a model that was trained using previous UE signaling. In accordance with embodiments herein, this previous signaling upon which the corrected positioning determination is based is associated with at least inertial measurements by the UE. An example of signaling associated with inertial measurements by a UE is shown at 718 in FIG. 7. As discussed above regarding signaling associated with channel estimation and signaling associated with corrected positioning determination, other signaling disclosed herein may be considered to be associated with such inertial measurements by a UE. It should also be noted that corrected positioning determination, such as a model, may be based on other signaling and/or parameters as well, such as previous reference signaling and/or other previous signaling associated with channel estimation.

In some embodiments, a method includes developing or obtaining a model for corrected positioning determination, as shown at 802. This may involve actually receiving and processing the previous signaling referenced above. Developing or obtaining a model, during a training phase or training stage for example, may also involve receiving signaling associated with current inertial measurements by a UE, in which case corrected positioning determination may be developed or obtained at 802 based on received signaling associated with channel estimation, received previous signaling, and received signaling associated with current inertial measurements by the UE.

To be clear, receiving signaling associated with channel estimation, receiving the previous signaling associated with inertial measurements, and/or receiving signaling associated with current inertial measurements by the UE need not necessarily involve separate receiving operations. For example, signaling indicative of positioning correction information and channel estimates of the wireless channel for multiple UE positions, in training data at 726 in FIG. 7 for example, is illustrative of signaling constitutes signaling associated with channel estimation, previous signaling associated with inertial measurements, and signaling associated with current inertial measurements. As an example, positioning correction information may include range/angle biases as discussed elsewhere herein.

Embodiments of the method 800 may perhaps best be illustrated in the context of further examples. Consider the LMF and LMF-AI interactions shown in FIG. 7. The LMF is involved in developing or obtaining corrected positioning determination by training a model. Signaling associated with channel estimation and signaling associated with current inertial measurements by the UE are received at 714, 716, 718. Previous signaling is also received during training data collection. In the example of LMF and LMF-AI interactions shown in FIG. 7, the signaling transmitted at 806 is the training data shown at 728, and is based on the received signaling associated with channel estimation, the received previous signaling, and the received signaling associated with current inertial measurements by the UE. This example should also clarify that developing or obtaining a corrected positioning determination at 802 need not necessarily be complete before other operations in FIG. 8 are performed. In this example, the received and transmitted signaling at 804, 806 are actually involved in developing or obtaining a model at 802.

Continuing with this example of an LMF and LMF-AI interaction in FIG. 7, a method may also involve determining position correction information and channel estimates of the wireless channel for multiple UE positions, based on the received signaling associated with channel estimation, the received previous signaling, and the received signaling associated with current inertial measurements by the UE. This may involve operations as shown at 720, 722, 724 in FIG. 7, for example. The signaling associated with corrected positioning determination, transmitted at 806, may then include information indicative of the positioning correction information and the respective channel estimates.

In some embodiments, the signaling at 806 is transmitted to a UE. Examples include signaling that is indicative of one or more parameters of the corrected positioning determination, and signaling that is indicative of one or more changes in one or more parameters of the corrected positioning determination. In some embodiments, an entire model developed or obtained during initial training is distributed to UEs, and thereafter only changes resulting from re-training are distributed to UEs.

It should be noted that parameters need not necessarily be distributed to UEs at all. Some embodiments involve bias inference and position estimation at network equipment. In such embodiments, the signaling at 806 is indicative of a corrected UE position.

The signaling at 806 may be or include network-side signaling, between network elements or equipment, as shown by way of example at 732.

Other operations may also or instead be performed. For example, re-training is shown at 808 in FIG. 8A. More generally, methods consistent with the present disclosure may include additional, fewer, and/or different operations, performed in a similar or different order.

As another example, although aspects of the present disclosure are described in the context of embodiments that involve backtracking, other embodiments are also possible. For example, forward tracking may also or instead be used. Forward tracking starts at a LoS point or location at the beginning of an NLoS trajectory and moves forward along the trajectory. Forward tracking and backward tracking involve similar calculations, and therefore features disclosed herein with reference to backtracking may also or instead be applied to forward tracking. For example, in an embodiment of backtracking we have $r_{t_i}$ and determine $r_{t_{i-1}}$ through using $r_{t_{i-1}} = r_{t_i} - \Delta r_{t_{i-1},t_i}$. In a counterpart embodiment for forward tracking we have $r_{t_{i-1}}$ and determine $r_{t_i}$ using $r_{t_{i-1}} + \Delta r_{t_{i-1},t_i} = r_{t_i}$.

Therefore, embodiments are not in any way restricted to identifying NLoS to LoS transitions and backtracking. Embodiments may also or instead involve identifying LoS to NLoS transitions and forward tracking. In some embodiments, both forward tracking and backtracking may be used. Consider, for example, a scenario in which a LoS to NLoS transition from a first LoS point is identified, and then a UE follows an NLoS trajectory until a second LoS point is identified. Forward tracking may be applied for a certain number of NLoS locations along the trajectory from the first LoS point, and backtracking may be applied for other locations along the trajectory in reverse order from the second LoS point. The number of UE locations for which data was collected between the first and second LoS points may be determined, and those points may be partitioned into forward tracking points and backtracking points, for example.

In general terms, a LoS/NLoS transition, which may be a transition from LoS to NLoS or from NLoS to LoS, may be identified to initiate UE position tracking, which may include forward tracking and/or backtracking.

With regard to UE position tracking, a method performed by network equipment may involve receiving signaling that is associated with channel estimation of a wireless channel for a UE and signaling associated with inertial measurements by the UE. Such a method may also involve, responsive to detecting a transition of the UE between NLoS communications and LoS communications, determining multiple UE positions during NLoS communications based on a LoS position of the UE and the inertial measurements and determining position correction information and channel estimates of the wireless channel for the plurality of UE positions based on the signaling that is associated with channel estimation. The transition may be from NLoS to LoS communications or from LoS to NLoS communications. The operations responsive to detection of such a transition may relate to backtracking or forward tracking of UE position. Embodiments that involve detecting both types of transition and both forward tracking and backtracking are also possible.

FIG. 8B is a flow chart illustrating an example of a method performed by a UE in an embodiment. Considering first the operations that focus on UE positioning, the example method 850 includes transmitting signaling to network equipment at 854. This signaling includes reference signaling such as SRS signaling for channel estimation of a wireless channel and signaling associated with inertial measurements by the UE. The UE then receives at 856, from the network equipment, signaling associated with corrected positioning determination for the UE. The corrected positioning determination is based on at least the transmitted reference signaling. In this example, the signaling associated with inertial measurements by the UE may be used in developing or obtaining a model, for example, that is subsequently used for corrected positioning determination based on the reference signaling.

The signaling received at 856 may be or include, for example, signaling that is indicative of one or more parameters of the corrected positioning determination, signaling that is indicative of one or more changes in one or more parameters of the corrected positioning determination, or signaling that is indicative of a corrected UE position. Model parameters may be used by a UE in determining or otherwise obtaining position as shown at 858, but model parameters need not necessarily be distributed to a UE in all embodiments. UE position may be determined by network equipment and signaled to the UE in some embodiments, and in such embodiments the UE need not determine or otherwise obtain positioning at 858.

A UE may also or instead perform other operations. Collecting the inertial measurements is shown as an example at 852. Other embodiments may include additional, fewer, and/or different operations, performed in a similar or different order.

As another example, a method performed by a UE may include collecting inertial measurements at 852, and transmitting signaling indicative of the inertial measurements to network equipment at 854. Off-UE transmission of such inertial measurements is currently believed to be new, and may open a vast range of new applications, not only for UE positioning but also possibly for other applications.

Figure 9:
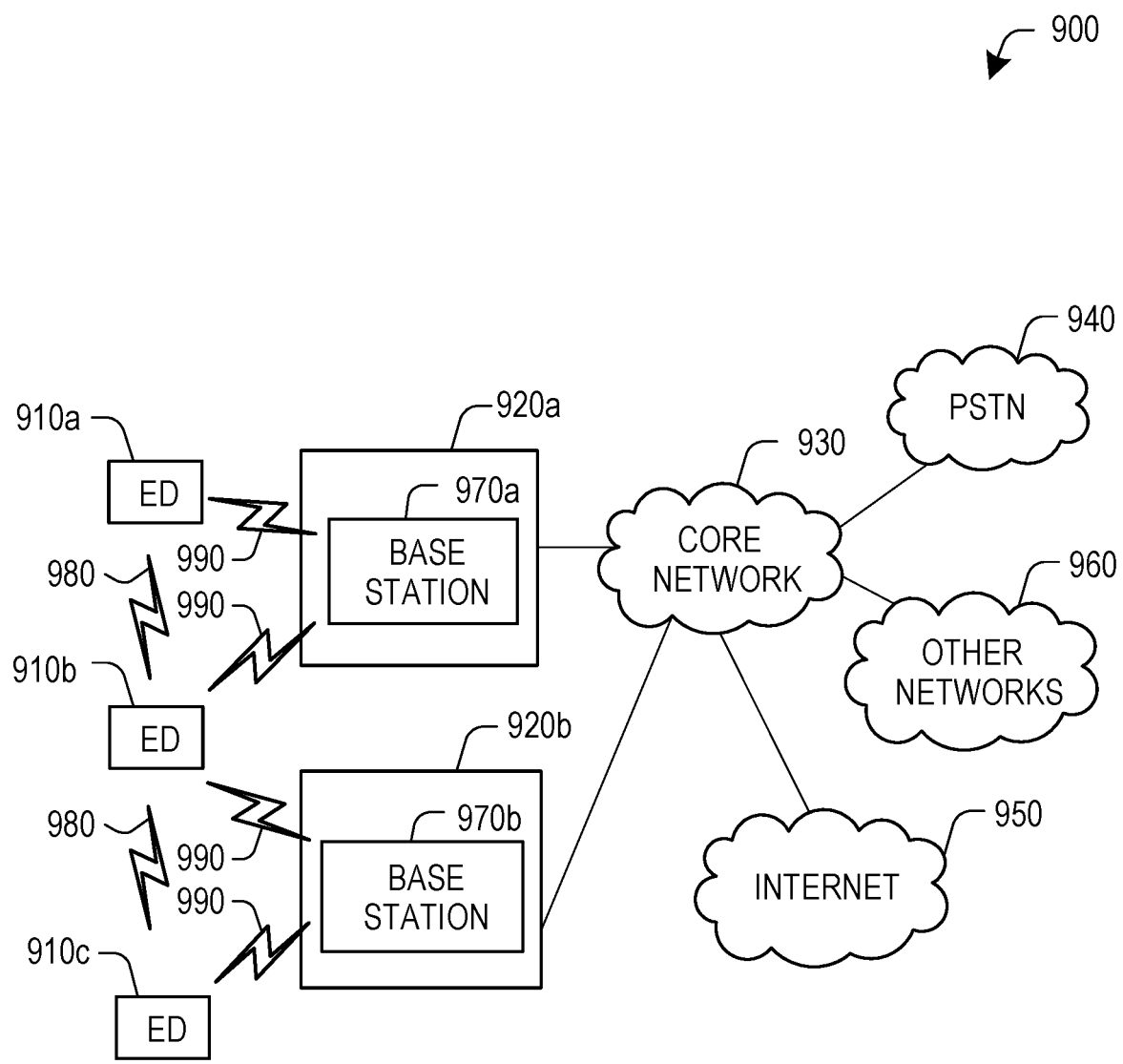
FIG. 9 illustrates an example communication system in which embodiments of the present disclosure could be implemented.

Various embodiments are disclosed by way of example above. FIG. 9 illustrates an example communication system 900 in which embodiments of the present disclosure could be implemented. In general, the communication system 900 enables multiple wireless or wired elements to communicate data and other content. The purpose of the communication system 900 may be to provide content (voice, data, video, text) via broadcast, narrowcast, user device to user device, etc. The communication system 900 may operate by sharing resources such as bandwidth.

In this example, the communication system 900 includes electronic devices (ED) 910a-910c, radio access networks (RANs) 920a-920b, a core network 930, a public switched telephone network (PSTN) 940, the internet 950, and other networks 960. Although certain numbers of these components or elements are shown in FIG. 9, any reasonable number of these components or elements may be included in the communication system 900.

The EDs 910a-910c are configured to operate, communicate, or both, in the communication system 900. For example, the EDs 910a-910c are configured to transmit, receive, or both via wireless or wired communication channels. Each ED 910a-910c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 9, the RANs 920a-920b include base stations 970a-970b, respectively. Each base station 970a-970b is configured to wirelessly interface with one or more of the EDs 910a-910c to enable access to any other base station 970a-970b, the core network 930, the PSTN 940, the internet 950, and/or the other networks 960. For example, the base stations 970a-970b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 910a-910c may be alternatively or additionally configured to interface, access, or communicate with any other base station 970a-970b, the internet 950, the core network 930, the PSTN 940, the other networks 960, or any combination thereof. The communication system 900 may include RANs wherein the corresponding base station accesses the core network 930 via the internet 950. In some embodiments the EDs 910a-910c include EDs that are able to communicate directly with each other through links 980.

The EDs 910a-910c and base stations 970a-970b are examples of communication equipment that can be configured to implement some or all of the functionality and/or embodiments described herein. In the embodiment shown in FIG. 9, the base station 970a forms part of the RAN 920a, which may include other base stations, base station controller(s) (BSC), radio network controller(s) (RNC), relay nodes, elements, and/or devices. Any base station 970a, 970b may be a single element, as shown, or multiple elements, distributed in the corresponding RAN, or otherwise. Also, the base station 970b forms part of the RAN 920b, which may include other base stations, elements, and/or devices. Each base station 970a-970b transmits and/or receives wireless signals within a particular geographic region or area, sometimes referred to as a "cell" or "coverage area". A cell may be further divided into cell sectors, and a base station 970a-970b may, for example, employ multiple transceivers to provide service to multiple sectors. In some embodiments there may be established pico or femto cells where the radio access technology supports such cells. In some embodiments, multiple transceivers could be used for each cell, for example using multiple-input multiple-output (MIMO) technology. The number of RANs 920a-920b shown is an example only. Any number of RANs may be contemplated when devising the communication system 900.

The base stations 970a-970b communicate with one or more of the EDs 910a-910c over one or more air interfaces 990 using wireless communication links e.g. radio frequency (RF), microwave, infrared (IR), etc. The air interfaces 990 may utilize any suitable radio access technology. For example, the communication system 900 may implement one or more channel access methods, such as code division multiple access (CDMA), time division multiple access (TDMA), frequency division multiple access (FDMA), orthogonal frequency division multiple access (OFDMA), or single-carrier FDMA (SC-FDMA) in the air interfaces 990.

A base station 970a-970b may implement Universal Mobile Telecommunication System (UMTS) Terrestrial Radio Access (UTRA) to establish an air interface 990 using wideband CDMA (WCDMA). In doing so, the base station 970a-970b may implement protocols such as HSPA, HSPA+ optionally including HSDPA, HSUPA or both. Alternatively, a base station 970a-970b may establish an air interface 990 with Evolved UTMS Terrestrial Radio Access (E-UTRA) using LTE, LTE-A, and/or LTE-B. It is contemplated that the communication system 900 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 920a-920b are in communication with the core network 930 to provide the EDs 910a-910c with various services such as voice, data, and other services. The RANs 920a-920b and/or the core network 930 may be in direct or indirect communication with one or more other RANs (not shown), which may or may not be directly served by core network 930, and may or may not employ the same radio access technology as RAN 920a, RAN 920b or both. The core network 930 may also serve as a gateway access between (i) the RANs 920a-920b or EDs 910a-910c or both, and (ii) other networks (such as the PSTN 940, the Internet 950, and the other networks 960). In addition, some or all of the EDs 910a-910c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 950. PSTN 940 may include circuit switched telephone networks for providing plain old telephone service (POTS). Internet 950 may include a network of computers and subnets (intranets) or both, and incorporate protocols, such as IP, TCP, UDP. EDs 910a-910c may be multimode devices capable of operation according to multiple radio access technologies, and incorporate multiple transceivers necessary to support such radio access technologies.

Figure 10A:
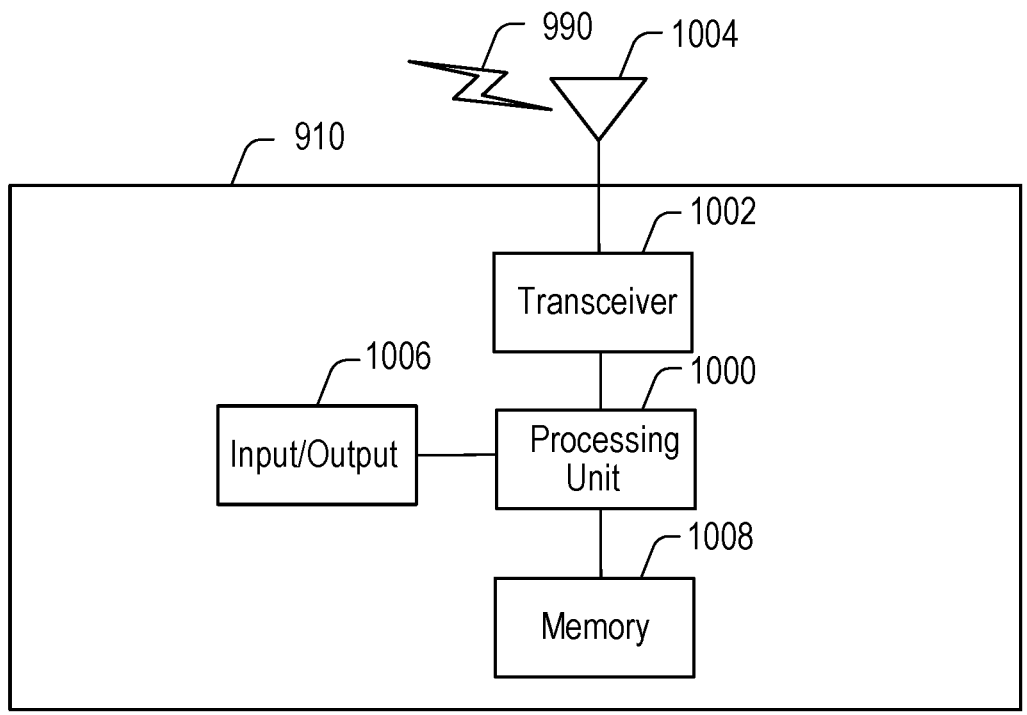
FIG. 10A is a block diagram of an example electronic device.
Figure 10B:
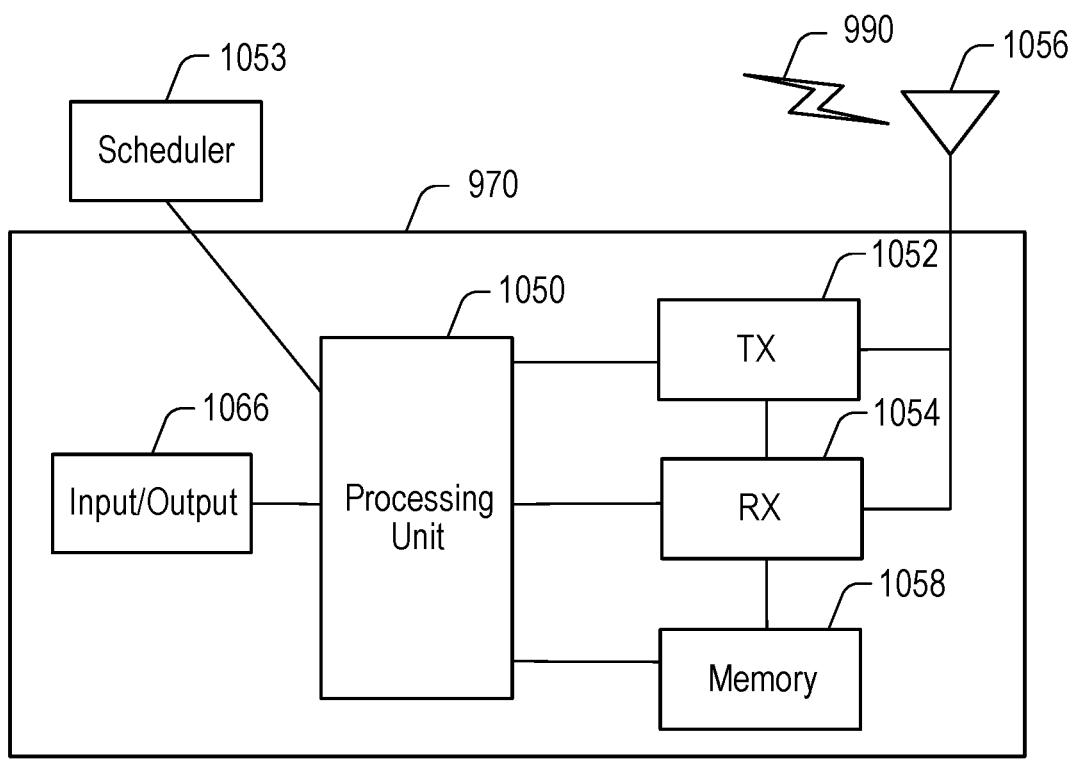
FIG. 10B is a block diagram of an example base station.

FIGS. 10A and 10B illustrate example devices that may implement the methods and teachings according to this disclosure. In particular, FIG. 10A illustrates an example ED 910, and FIG. 10B illustrates an example base station 970. These components could be used in the communication system 900 or in any other suitable system.

As shown in FIG. 10A, the ED 910 includes at least one processing unit 1000. The processing unit 1000 implements various processing operations of the ED 910. For example, the processing unit 1000 could perform signal coding, data processing, power control, input/output processing, or any other functionality enabling the ED 910 to operate in the communication system 900. The processing unit 1000 may also be configured to implement some or all of the functionality and/or embodiments described in more detail herein. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 910 also includes at least one transceiver 1002. The transceiver 1002 is configured to modulate data or other content for transmission by at least one antenna or Network Interface Controller (NIC) 1004. The transceiver 1002 is also configured to demodulate data or other content received by the at least one antenna 1004. Each transceiver 1002 includes any suitable structure for generating signals for wireless or wired transmission and/or processing signals received wirelessly or by wire. Each antenna 1004 includes any suitable structure for transmitting and/or receiving wireless or wired signals. One or multiple transceivers 1002 could be used in the ED 910. One or multiple antennas 1004 could be used in the ED 910. Although shown as a single functional unit, a transceiver 1002 could also be implemented using at least one transmitter and at least one separate receiver.

The ED 910 further includes one or more input/output devices 1006 or interfaces (such as a wired interface to the internet 950 in FIG. 9). The input/output devices 1006 permit interaction with a user or other devices in the network. Each input/output device 1006 includes any suitable structure for providing information to or receiving information from a user, such as a speaker, microphone, keypad, keyboard, display, or touch screen, including network interface communications.

In addition, the ED 910 includes at least one memory 1008. The memory 1008 stores instructions and data used, generated, or collected by the ED 910. For example, the memory 1008 could store software instructions or modules configured to implement some or all of the functionality and/or embodiments described herein and that are executed by the processing unit(s) 1000. Each memory 1008 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 970 includes at least one processing unit 1050, at least one transmitter 1052, at least one receiver 1054, one or more antennas 1056, at least one memory 1058, and one or more input/output devices or interfaces 1066. A transceiver, not shown, may be used instead of the transmitter 1052 and receiver 1054. A scheduler 1053 may be coupled to the processing unit 1050. The scheduler 1053 may be included within or operated separately from the base station 970. The processing unit 1050 implements various processing operations of the base station 970, such as signal coding, data processing, power control, input/output processing, or any other functionality. The processing unit 1050 can also be configured to implement some or all of the functionality and/or embodiments described in more detail herein. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transmitter 1052 includes any suitable structure for generating signals for wireless or wired transmission to one or more EDs or other devices. Each receiver 1054 includes any suitable structure for processing signals received wirelessly or by wire from one or more EDs or other devices. Although shown as separate components, at least one transmitter 1052 and at least one receiver 1054 could be combined into a transceiver. Each antenna 1056 includes any suitable structure for transmitting and/or receiving wireless or wired signals. Although a common antenna 1056 is shown here as being coupled to both the transmitter 1052 and the receiver 1054, one or more antennas 1056 could be coupled to the transmitter(s) 1052, and one or more separate antennas 1056 could be coupled to the receiver(s) 1054. Each memory 1058 includes any suitable volatile and/or non-volatile storage and retrieval device(s) such as those described above in connection to the ED 910 in FIG. 10A. The memory 1058 stores instructions and data used, generated, or collected by the base station 970. For example, the memory 1058 could store software instructions or modules configured to implement some or all of the functionality and/or embodiments described herein and that are executed by the processing unit(s) 1050.

Each input/output device 1066 permits interaction with a user or other devices in the network. Each input/output device 1066 includes any suitable structure for providing information to or receiving/providing information from a user, including network interface communications.

Figure 11:
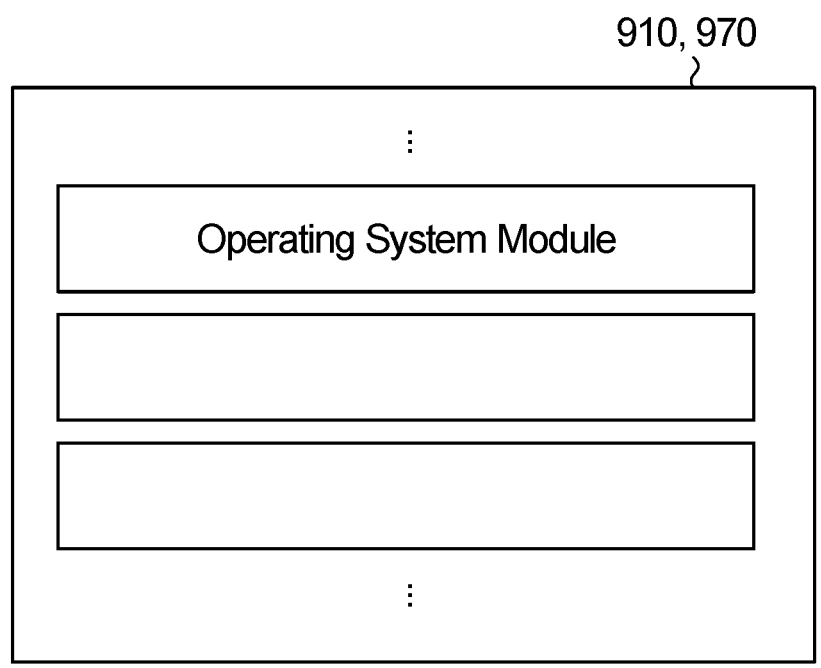
FIG. 11 is a block diagram of component modules.

It should be appreciated that one or more steps of the embodiment methods provided herein may be performed by corresponding units or modules, according to FIG. 11. For example, a signal may be transmitted by a transmitting unit or a transmitting module. A signal may be received by a receiving unit or a receiving module. A signal may be processed by a processing unit or a processing module. Other steps may be performed by an ML module. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs such as 910 and base stations such as 970 are known to those of skill in the art. As such, these details are omitted here.

In general, apparatus embodiments implementing methods as disclosed herein could take any of various forms. For example, in an embodiment, network equipment for a wireless communication network includes a receiver, a processor coupled to the receiver, and a processor-readable memory coupled to the processor. Network equipment also includes a transmitter coupled to the processor in some embodiments. The base station 970 is an example of such network equipment, a receiver 1054, a transmitter 1052, a processor in the form of a processing unit 1050 coupled to the receiver and to the transmitter, and a processor-readable memory 1058 coupled to the processing unit.

The processor-readable memory stores processor-executable instructions which, when executed by the processor, cause the processor to perform a method as disclosed herein. As an example, such a method may involve receiving signaling that is associated with channel estimation of a wireless channel for a UE, and transmitting signaling associated with corrected positioning determination for the UE. The corrected positioning determination is based on the received signaling and previous signaling by the UE or another UE, and the previous signaling is associated with inertial measurements by the UE or the other UE.

Features that are described elsewhere herein are also applicable to network equipment embodiments. For example, embodiments may include any one or more of the following features, in any of various combinations:

the processor-executable instructions, when executed by the processor, further cause the processor to: receive the previous signaling; receive signaling associated with current inertial measurements by the UE; and obtain the corrected positioning determination based on the received signaling associated with channel estimation, the received previous signaling, and the received signaling associated with current inertial measurements by the UE;

the signaling associated with channel estimation, the previous signaling, and the signaling associated with current inertial measurements by the UE include signaling indicative of positioning correction information and channel estimates of the wireless channel for multiple UE positions;

the signaling associated with corrected positioning determination is or includes signaling indicative of one or more parameters of the corrected positioning determination;

the signaling associated with corrected positioning determination is or includes signaling indicative of one or more changes in one or more parameters of the corrected positioning determination;

the processor-executable instructions, when executed by the processor, further cause the processor to receive the previous signaling and receive signaling associated with current inertial measurements by the UE;

the signaling associated with corrected positioning determination is or includes information based on the received signaling associated with channel estimation, the received previous signaling, and the received signaling associated with current inertial measurements by the UE;

the processor-executable instructions, when executed by the processor, further cause the processor to determine, based on the received signaling associated with channel estimation, the received previous signaling, and the received signaling associated with current inertial measurements by the UE, positioning correction information and channel estimates of the wireless channel for multiple UE positions;

the signaling associated with corrected positioning determination is or includes information indicative of the positioning correction information and the channel estimates;

the transmitting involves transmitting to the UE the signaling associated with corrected positioning determination;

the signaling transmitted to the UE is indicative of one or more parameters of the corrected positioning determination, or is indicative of one or more changes in one or more parameters of the corrected positioning determination;

the signaling associated with corrected positioning determination is indicative of a corrected UE position.

According to another embodiment, instructions stored in a processor-readable memory at network equipment cause a network equipment processor to perform a method that involves: receiving signaling that is associated with channel estimation of a wireless channel for a UE and signaling associated with inertial measurements by the UE; and, responsive to detecting a transition of the UE between NLoS communications and LoS communications, determining a plurality of UE positions during NLoS communications based on a LoS position of the UE and the inertial measurements and determining position correction information and channel estimates of the wireless channel for the plurality of UE positions based on the signaling that is associated with channel estimation.

Other network equipment embodiments, including features that are disclosed elsewhere herein, are also possible.

For example, a wireless communication network will likely include multiple installations of network equipment. In an embodiment, a wireless communication network includes multiple base stations, with at least some of those base stations being implemented as, or at least including, network equipment as disclosed herein. Similarly, a wireless communication network may also or instead include at least some UEs that are implemented as disclosed herein.

Method embodiments and network equipment embodiments represent illustrative example implementations of features disclosed herein. Such features could also or instead be implemented in the form of processor-executable instructions stored in a processor-readable memory. These processor-executable instructions, when executed by a processor in network equipment in a wireless communication network, cause the processor to perform a method.

In some embodiments, the method includes receiving signaling that is associated with channel estimation of a wireless channel for a UE, and transmitting signaling associated with corrected positioning determination for the UE. The corrected positioning determination is based on the received signaling and previous signaling by the UE or another UE, and the previous signaling is associated with inertial measurements by the UE or the other UE.

According to another embodiment, the method includes receiving signaling that is associated with channel estimation of a wireless channel for a UE and signaling associated with inertial measurements by the UE; and, responsive to detecting a transition of the UE between NLoS communications and LoS communications, determining a plurality of UE positions during NLoS communications based on a LoS position of the UE and the inertial measurements and determining position correction information and channel estimates of the wireless channel for the plurality of UE positions based on the signaling that is associated with channel estimation.

Features that are disclosed elsewhere herein are also applicable to methods that are implemented in the form of processor-executable instructions stored in processor-readable memory.

At least some features disclosed herein are applicable to UEs. For example, according to an embodiment, a UE includes a transmitter, a receiver, a processor coupled to the transmitter and to the receiver; and a processor-readable memory, coupled to the processor, and storing processor-executable instructions which, when executed by the processor, cause the processor to perform a method that involves: transmitting, to network equipment, reference signaling for channel estimation of a wireless channel and signaling associated with inertial measurements by the UE; and receiving, from the network equipment, signaling associated with corrected positioning determination for the UE. The corrected positioning determination is based on the transmitted reference signaling.

Features that are described elsewhere herein are also applicable to UE embodiments. For example, embodiments may include any one or more of the following features, in any of various combinations:

the signaling associated with corrected positioning determination is or includes signaling indicative of one or more parameters of the corrected positioning determination;

the signaling associated with corrected positioning determination is or includes signaling indicative of one or more changes in one or more parameters of the corrected positioning determination;

the signaling associated with corrected positioning determination is indicative of a corrected UE position;

the processor-executable instructions, when executed by the processor, further cause the processor to: collect the inertial measurements;

the UE also includes an IMU, coupled to the processor, to collect the inertial measurements and provide the inertial measurements to the processor.

According to another embodiment, a UE includes an IMU to collect inertial measurements and a transmitter, coupled to the IMU, to transmit signaling indicative of the inertial measurements. Other UE features such as those disclosed elsewhere herein may be implemented in conjunction with such a UE.

UE features may also or instead be implemented in the form of a processor-readable memory storing processor-executable instructions which, when executed by a processor in a UE in a wireless communication network, cause the processor to perform a method. As an example, a method may include transmitting, to network equipment, reference signaling for channel estimation of a wireless channel and signaling associated with inertial measurements by the UE; and receiving, from the network equipment, signaling associated with corrected positioning determination for the UE, the corrected positioning determination being based on the transmitted reference signaling. As another example, a method may involve collecting inertial measurements; and transmitting signaling indicative of the inertial measurements.

Other UE features disclosed herein may be implemented in processor-readable memory embodiments.

In general, the present disclosure contemplates embodiments in which NLoS range or delay bias and angle bias are estimated by integrating the power of AI with the convenience of model-based/classic positioning. Embodiments that make use of IMU data for Radio Access Technology (RAT) positioning are also disclosed. In some embodiments, IMU and GPS are combined for RAT-based positioning. Instead of using separate expert systems and offline training, some embodiments collect training data through UE crowdsourcing. Centralized processing by an LMF, for example, may enable other useful features such as jointly estimating NLoS range and angle biases from all BSs. Channel reciprocity is leveraged in some embodiments, to enable DL positioning based on UL NLoS estimates.

Embodiments may realize significant time savings during training, relative to expert system-based training data collection. Training data is contributed by all active UEs, and online during UE-BS communications in some embodiments. Online training data collection may also improve robustness, in that no separate surveying stage is required for training. Correcting for NLoS bias as disclosed herein can also enhance UE positioning accuracy. Security may also be improved, in embodiments in which a model is transferred to UEs, such as for DL positioning where there is channel reciprocity. The disclosed embodiments have no need for ground-truth NLoS biases, and therefore scalability is improved relative to ground-truth-dependent techniques. Embodiments may also be preferable over other techniques in terms of backward compatibility and ease of integration into 5G positioning subsystems, for example.

Potentially more accurate UE positioning determination unleashes various new or improved applications. For instance, the success of NR relies heavily on the concept of beamforming which, in turn, depends on beam sweeping where a BS sweeps its field of view with beams that have narrower beamwidth. If the location of UEs is not accurately known, the BS is unaware of the direction(s) that might be more worthwhile to sweep and/or the direction(s) that might best to be avoided. Avoiding a direction might be preferable when there is heavy blockage between a transmitter and a receiver, for example. The blind beam sweeping philosophy can be improved through a proactive approach where locations of UEs are taken into account at a BS, and provided as input to a beam prediction or beam sweeping algorithm so that a BS can then select beams that would serve UEs rather than aiming at empty space where no UEs are located.

Numerous modifications and variations of the present disclosure are possible in light of the above teachings. It is therefore to be understood that within the scope of the appended claims, the disclosure may be practiced otherwise than as specifically described herein.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

Although this disclosure refers to illustrative embodiments, the disclosure is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

For the simplicity of illustration of certain embodiments, in the present disclosure an assumption was made that a UE's orientation does not change over time. Extension to the case that both UE location and orientation change is straightforward. For example, IMUs not only measure 3-axes accelerations but also 3-axes angular velocities, using gyroscopes.

ML is an emerging and fast-growing field, as a result of advances in computer architecture such as General Purpose Graphics Processing Units (GP-GPUs). As an example, deep CNNs have attracted attention because of their ability to find patterns in data with intrinsic structure through the use of convolutional filters. The application of ML to the field of communications is largely unexplored and may help outperform existing solutions and/or help reshape wireless networks conceptually. ML modules as referenced herein are intended to be components or blocks based on an implementation of ML mechanisms. One example of an ML implementation is a neural network implemented in hardware, one or more components that execute software, or a combination thereof.

It should be appreciated that although ML is used in some embodiments and may be quite useful and efficient in predicting NLoS bias or errors, for example, ML represents only one possible type of implementation. Non-ML embodiments are also possible.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as processor-executable or computer-executable instructions stored on a non-transitory processor-readable or computer-readable medium, for example. Such media could store programming or instructions to perform any of various methods consistent with the present disclosure.

Moreover, any module, component, or device exemplified herein that executes instructions may include or otherwise have access to a non-transitory computer-/processor-readable storage medium or media for storage of information, such as computer-/processor-readable instructions, data structures, program modules, and/or other data. A non-exhaustive list of examples of non-transitory computer-/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer-/processor-readable storage media may be part of a device or accessible or connectable thereto. Any application or module herein described may be implemented using computer-/processor-readable/executable instructions that may be stored or otherwise held by such non-transitory computer-/processor-readable storage media.

The invention claimed is:

1. A method performed by network equipment in a wireless communication network, the method comprising:
    receiving signaling that is associated with channel estimation of a wireless channel for a User Equipment (UE);
    transmitting signaling associated with corrected positioning determination for the UE, the corrected positioning determination being based on the received signaling and previous signaling by a plurality of UEs in the wireless communication network, the previous signaling being associated with inertial measurements by the plurality of UEs;
the method further comprising:
    receiving the previous signaling;
    receiving signaling associated with current inertial measurements by the UE;
    obtaining the corrected positioning determination by training a model based on the received signaling associated with channel estimation, the received previous signaling, and the received signaling associated with current inertial measurements by the UE.

2. The method of claim 1, wherein receiving signaling associated with channel estimation, receiving the previous signaling, and receiving signaling associated with current inertial measurements by the UE comprise receiving signaling indicative of positioning correction information and channel estimates of the wireless channel for a plurality of UE positions.

3. The method of claim 1, wherein the transmitting comprises transmitting signaling indicative of one or more parameters of the model or signaling indicative of one or more changes in one or more parameters of the model.

4. The method of claim 1, wherein the signaling associated with corrected positioning determination comprises information indicative of training data for training the model, the training data based on the received signaling associated with channel estimation, the received previous signaling, and the received signaling associated with current inertial measurements by the UE.

5. The method of claim 1, further comprising:
responsive to detecting a transition of the UE between Non Line of Sight (NLoS) communications and Line of Sight (LoS) communications: determining a plurality of UE positions of the UE during NLoS communications based on a LoS position of the UE and the current inertial measurements by the UE; and determining position correction information and channel estimates of the wireless channel for the plurality of UE positions based on the signaling that is associated with channel estimation.

6. The method of claim 5, wherein the transition is from NLoS to LoS communications for backtracking of UE position or from LoS to NLoS communications for forward tracking of UE position.

7. Network equipment for a wireless communication network, the network equipment comprising:
a receiver;
a transmitter;
a processor coupled to the receiver and to the transmitter; and
a processor-readable memory, coupled to the processor, and storing processor-executable instructions which, when executed by the processor, cause the processor to perform a method comprising:
receiving signaling that is associated with channel estimation of a wireless channel for a User Equipment (UE);
transmitting signaling associated with corrected positioning determination for the UE, the corrected positioning determination being based on the received signaling and previous signaling by a plurality of UEs in the wireless communication network, the previous signaling being associated with inertial measurements by the plurality of UEs;
the processor-executable instructions, when executed by the processor, further causing the processor to:
receive the previous signaling;
receive signaling associated with current inertial measurements by the UE;
obtain the corrected positioning determination by training a model based on the received signaling associated with channel estimation, the received previous signaling, and the received signaling associated with current inertial measurements by the UE.

8. The network equipment of claim 7, wherein the signaling associated with channel estimation, the previous signaling, and the signaling associated with current inertial measurements by the UE comprise signaling indicative of positioning correction information and channel estimates of the wireless channel for a plurality of UE positions.

9. The network equipment of claim 7, wherein the signaling associated with corrected positioning determination comprises signaling indicative of one or more parameters of the model or signaling indicative of one or more changes in one or more parameters of the model.

10. The network equipment of claim 7, wherein the signaling associated with corrected positioning determination comprises information indicative of training data for training the model, the training data based on the received signaling associated with channel estimation, the received previous signaling, and the received signaling associated with current inertial measurements by the UE.

11. The network equipment of claim 7, the processor-executable instructions, when executed by the processor, further causing the processor to:
responsive to detecting a transition of the UE between Non Line of Sight (NLoS) communications and Line of Sight (LoS) communications: determine a plurality of UE positions of the UE during NLoS communications based on a LoS position of the UE and the current inertial measurements by the UE; and determine position correction information and channel estimates of the wireless channel for the plurality of UE positions based on the signaling that is associated with channel estimation.

12. The network equipment of claim 11, wherein the transition is from NLoS to LoS communications for backtracking of UE position or from LoS to NLoS communications for forward tracking of UE position.

13. A processor-readable memory storing processor-executable instructions which, when executed by a processor in network equipment in a wireless communication network, cause the processor to perform a method comprising:
receiving signaling that is associated with channel estimation of a wireless channel for a User Equipment (UE);
transmitting signaling associated with corrected positioning determination for the UE, the corrected positioning determination being based on the received signaling and previous signaling by a plurality of UEs in the wireless communication network, the previous signaling being associated with inertial measurements by the plurality of UEs;
the processor-executable instructions, when executed by the processor, further causing the processor to:
receive the previous signaling;
receive signaling associated with current inertial measurements by the UE;
obtain the corrected positioning determination by training a model based on the received signaling associated with channel estimation, the received previous signaling, and the received signaling associated with current inertial measurements by the UE.

14. A method performed by a User Equipment (UE) in a wireless communication network, the method comprising:
transmitting, to network equipment, reference signaling for channel estimation of a wireless channel and signaling associated with inertial measurements by the UE;
receiving, from the network equipment, signaling associated with corrected positioning determination for the UE, the corrected positioning determination being based on the transmitted reference signaling and previous signaling by a plurality of UEs in the wireless communication network, the previous signaling being associated with inertial measurements by the plurality of UEs,
the corrected positioning determination being obtained by training a model based on the reference signaling for channel estimation, the signaling associated with inertial measurements by the UE, and the previous signaling.

15. The method of claim 14, wherein the signaling associated with corrected positioning determination comprises signaling indicative of one or more parameters of the model or signaling indicative of one or more changes in one or more parameters of the model.

16. The method of claim 14, wherein the signaling associated with corrected positioning determination is indicative of a corrected UE position.

17. A User Equipment (UE) comprising:
- a transmitter;
- a receiver;
- a processor coupled to the transmitter and to the receiver; and
- a processor-readable memory, coupled to the processor, and storing processor-executable instructions which, when executed by the processor, cause the processor to perform a method comprising:
- transmitting, to network equipment in a wireless communication network, reference signaling for channel estimation of a wireless channel and signaling associated with inertial measurements by the UE;
- receiving, from the network equipment, signaling associated with corrected positioning determination for the UE, the corrected positioning determination being based on the transmitted reference signaling and previous signaling by a plurality of UEs in the wireless communication network, the previous signaling being associated with inertial measurements by the plurality of UEs,
- the corrected positioning determination being obtained by training a model based on the reference signaling for channel estimation, the signaling associated with inertial measurements by the UE, and the previous signaling.

18. The UE of claim 17, wherein the signaling associated with corrected positioning determination comprises signaling indicative of one or more parameters of the model or signaling indicative of one or more changes in one or more parameters of the model.

19. The UE of claim 17, wherein the signaling associated with corrected positioning determination is indicative of a corrected UE position.

20. The UE of claim 17, further comprising:
- an Inertial Measurement Unit (IMU), coupled to the processor, to collect the inertial measurements and provide the inertial measurements to the processor.

21. A processor-readable memory storing processor-executable instructions which, when executed by a processor in a User Equipment (UE) in a wireless communication network, cause the processor to perform a method comprising:
- transmitting, to network equipment, reference signaling for channel estimation of a wireless channel and signaling associated with inertial measurements by the UE;
- receiving, from the network equipment, signaling associated with corrected positioning determination for the UE, the corrected positioning determination being based on the transmitted reference signaling and previous signaling by a plurality of UEs in the wireless communication network, the previous signaling being associated with inertial measurements by the plurality of UEs,
- the corrected positioning determination being obtained by training a model based on the reference signaling for channel estimation, the signaling associated with inertial measurements by the UE, and the previous signaling.

* * * * *